(12) United States Patent
Tucholski

(10) Patent No.: US 9,444,078 B2
(45) Date of Patent: Sep. 13, 2016

(54) BATTERY CELL CONSTRUCTION

(71) Applicant: Blue Spark Technologies, Inc., Westlake, OH (US)

(72) Inventor: Gary R. Tucholski, North Royalton, OH (US)

(73) Assignee: BLUE SPARK TECHNOLOGIES, INC., Westlake, OH (US)

( * ) Notice: Subject to any disclaimer, the term of this patent is extended or adjusted under 35 U.S.C. 154(b) by 170 days.

(21) Appl. No.: 14/091,981

(22) Filed: Nov. 27, 2013

(65) Prior Publication Data
US 2014/0147723 A1 May 29, 2014

Related U.S. Application Data

(60) Provisional application No. 61/730,083, filed on Nov. 27, 2012.

(51) Int. Cl.
| | |
|---|---|
| *H01M 6/40* | (2006.01) |
| *H01M 6/46* | (2006.01) |
| *H01M 2/02* | (2006.01) |
| *H01M 4/70* | (2006.01) |
| *H01M 6/04* | (2006.01) |
| *H01M 4/08* | (2006.01) |
| *H01M 4/12* | (2006.01) |
| *H01M 6/06* | (2006.01) |

(52) U.S. Cl.
CPC ............. *H01M 2/0215* (2013.01); *H01M 4/70* (2013.01); *H01M 6/045* (2013.01); *H01M 6/40* (2013.01); *H01M 6/46* (2013.01); *H01M 4/08* (2013.01); *H01M 4/12* (2013.01); *H01M 6/06* (2013.01); *H01M 2300/0005* (2013.01); *H01M 2300/0014* (2013.01)

(58) Field of Classification Search
None
See application file for complete search history.

(56) References Cited

U.S. PATENT DOCUMENTS

| 629,325 A | 7/1899 | Ashley |
|---|---|---|
| 629,372 A | 7/1899 | Kennedy |

(Continued)

FOREIGN PATENT DOCUMENTS

| DE | 19943961 A1 | 6/2000 |
|---|---|---|
| EP | 0678927 A1 | 10/1995 |

(Continued)

OTHER PUBLICATIONS

Acheson Colloids Company, "Sales Information Bulletin," Port Huron, MI.

(Continued)

*Primary Examiner* — Daniel Gatewood
(74) *Attorney, Agent, or Firm* — Pearne & Gordon LLP

(57) ABSTRACT

A flexible battery includes at least one electrochemical cell for generating an electrical current, including a cathode collector layer, a cathode layer, an anode layer, and an optional anode collector layer, some or all of which are formed of a dried or cured ink. A first substrate includes a pair of opposed side portions. A first electrode contact is provided that is electrically coupled to the cathode collector layer and is disposed along one of the pair of opposed side portions of the first substrate, and a second electrode contact is provided that is electrically coupled to the anode layer and is disposed along the other of the pair of opposed side portions of the first substrate. The cathode collector layer includes a geometry having a height and a width such that the number of squares is approximately 5 or less.

24 Claims, 6 Drawing Sheets

(56) References Cited

U.S. PATENT DOCUMENTS

| | | |
|---|---|---|
| 2,154,312 A | 4/1939 | Maccallum |
| 2,480,531 A | 8/1949 | Wilke |
| 2,637,757 A | 5/1953 | Wilke |
| 2,688,649 A | 9/1954 | Bjorksten |
| 2,903,498 A | 9/1959 | Sindel et al. |
| 2,905,738 A | 9/1959 | Di Pasquale et al. |
| 3,006,980 A | 10/1961 | Story |
| 3,230,115 A | 1/1966 | Tamminen |
| 3,375,136 A | 3/1968 | Biggar |
| 3,655,449 A | 4/1972 | Yamamoto et al. |
| 3,770,504 A | 11/1973 | Bergum |
| 3,799,808 A | 3/1974 | Hancock |
| 3,847,669 A | 11/1974 | Paterniti |
| 3,901,732 A | 8/1975 | Kalnoki Kis et al. |
| 3,928,077 A | 12/1975 | Sperandio et al. |
| 3,954,506 A | 5/1976 | Sullivan |
| 3,967,292 A | 6/1976 | Delahunt |
| 3,980,497 A | 9/1976 | Gillman et al. |
| 3,988,168 A | 10/1976 | Bruneau |
| 3,993,508 A | 11/1976 | Erlichman |
| 4,001,467 A | 1/1977 | Sullivan |
| 4,006,036 A | 2/1977 | Charkoudian |
| 4,007,472 A | 2/1977 | Land |
| 4,028,479 A | 6/1977 | Fanciullo et al. |
| 4,042,760 A | 8/1977 | Land |
| 4,047,289 A | 9/1977 | Wolff |
| 4,060,669 A | 11/1977 | Fanciullo |
| 4,070,528 A | 1/1978 | Bergum et al. |
| 4,080,728 A | 3/1978 | Buckler |
| 4,086,399 A | 4/1978 | Hyland et al. |
| 4,086,400 A | 4/1978 | Hyland et al. |
| 4,098,965 A | 7/1978 | Kinsman |
| 4,105,815 A | 8/1978 | Buckler |
| 4,105,831 A | 8/1978 | Plasse |
| 4,112,205 A | 9/1978 | Charkoudian et al. |
| 4,118,860 A | 10/1978 | Buckler et al. |
| 4,119,770 A | 10/1978 | Land |
| 4,124,742 A | 11/1978 | Land et al. |
| 4,125,684 A | 11/1978 | Land |
| 4,125,685 A | 11/1978 | Bloom et al. |
| 4,125,686 A | 11/1978 | Kinsman |
| 4,136,236 A | 1/1979 | Ruetschi |
| 4,137,627 A | 2/1979 | Kinsman |
| 4,145,485 A | 3/1979 | Kinsman |
| 4,150,200 A | 4/1979 | Sullivan |
| 4,152,825 A | 5/1979 | Bruneau |
| 4,172,184 A | 10/1979 | Bloom et al. |
| 4,172,319 A | 10/1979 | Bloom et al. |
| 4,175,052 A | 11/1979 | Norteman, Jr. |
| 4,177,330 A | 12/1979 | Gordon et al. |
| 4,177,552 A | 12/1979 | Gordon et al. |
| 4,181,778 A | 1/1980 | Land |
| 4,185,144 A | 1/1980 | Ames et al. |
| 4,194,061 A | 3/1980 | Land et al. |
| 4,195,121 A | 3/1980 | Peterson |
| 4,204,036 A | 5/1980 | Cohen et al. |
| 4,232,099 A | 11/1980 | Sullivan |
| 4,242,424 A | 12/1980 | Buckler et al. |
| 4,254,191 A | 3/1981 | Kniazzeh |
| 4,256,813 A | 3/1981 | Kniazzeh |
| 4,287,274 A | 9/1981 | Ibbotson et al. |
| 4,345,954 A | 8/1982 | Panchu |
| 4,361,633 A | 11/1982 | Nel et al. |
| 4,389,470 A | 6/1983 | Plasse |
| 4,400,452 A | 8/1983 | Bruder |
| 4,427,748 A | 1/1984 | Land |
| 4,429,026 A | 1/1984 | Bruder |
| 4,455,358 A | 6/1984 | Graham et al. |
| 4,466,470 A | 8/1984 | Bruder |
| 4,477,544 A | 10/1984 | Bruder |
| 4,502,903 A | 3/1985 | Bruder |
| 4,505,996 A | 3/1985 | Simonton |
| 4,525,439 A | 6/1985 | Simonton |
| 4,532,193 A | 7/1985 | Kniazzeh et al. |
| 4,539,275 A | 9/1985 | Plasse |
| 4,554,226 A | 11/1985 | Simonton |
| 4,604,334 A | 8/1986 | Tarascon |
| 4,608,279 A | 8/1986 | Schumm, Jr. |
| 4,609,597 A | 9/1986 | Plasse |
| 4,621,035 A | 11/1986 | Bruder |
| 4,623,598 A | 11/1986 | Waki et al. |
| 4,664,993 A | 5/1987 | Sturgis et al. |
| 4,756,717 A | 7/1988 | Sturgis et al. |
| 4,889,777 A | 12/1989 | Akuto |
| 4,916,035 A | 4/1990 | Yamashita et al. |
| 4,977,046 A | 12/1990 | Bleszinski, Jr. et al. |
| 4,997,732 A | 3/1991 | Austin et al. |
| 5,035,965 A | 7/1991 | Sangyoji et al. |
| 5,055,968 A | 10/1991 | Nishi et al. |
| 5,110,696 A | 5/1992 | Shokoohi et al. |
| 5,116,701 A | 5/1992 | Kalisz |
| 5,120,785 A | 6/1992 | Walker et al. |
| 5,217,828 A | 6/1993 | Sangyoji et al. |
| 5,259,891 A | 11/1993 | Matsuyama et al. |
| 5,326,652 A | 7/1994 | Lake |
| 5,330,860 A | 7/1994 | Grot et al. |
| 5,338,625 A | 8/1994 | Bates et al. |
| 5,350,645 A | 9/1994 | Lake et al. |
| 5,401,590 A | 3/1995 | Chalilpoyil et al. |
| 5,415,888 A | 5/1995 | Banerjee et al. |
| 5,424,151 A | 6/1995 | Koksbang et al. |
| 5,445,856 A | 8/1995 | Chaloner-Gill |
| 5,455,127 A | 10/1995 | Olsen et al. |
| 5,470,357 A | 11/1995 | Schmutz et al. |
| 5,514,492 A | 5/1996 | Marincic et al. |
| 5,547,911 A | 8/1996 | Grot |
| 5,565,143 A | 10/1996 | Chan |
| 5,578,390 A | 11/1996 | Hughen |
| 5,587,254 A | 12/1996 | Kojima et al. |
| 5,620,580 A | 4/1997 | Okabe et al. |
| 5,622,652 A | 4/1997 | Kucherovsky et al. |
| 5,624,468 A | 4/1997 | Lake |
| 5,637,418 A | 6/1997 | Brown et al. |
| 5,652,043 A | 7/1997 | Nitzan |
| 5,658,684 A | 8/1997 | Lake |
| 5,728,181 A | 3/1998 | Jung et al. |
| 5,735,912 A | 4/1998 | Lake |
| 5,735,914 A | 4/1998 | Lake |
| 5,747,190 A | 5/1998 | Lake |
| 5,759,215 A | 6/1998 | Masuda |
| 5,779,839 A | 7/1998 | Tuttle et al. |
| 5,811,204 A | 9/1998 | Nitzan |
| 5,865,859 A | 2/1999 | Lake |
| 5,897,522 A | 4/1999 | Nitzan |
| 5,906,661 A | 5/1999 | Lake |
| 5,930,023 A | 7/1999 | Mitchell, Jr. et al. |
| 5,941,844 A | 8/1999 | Eckenhoff |
| 6,025,089 A | 2/2000 | Lake |
| 6,030,423 A | 2/2000 | Lake |
| 6,030,721 A | 2/2000 | Lake |
| 6,045,942 A | 4/2000 | Miekka et al. |
| 6,078,842 A | 6/2000 | Gross et al. |
| 6,084,380 A | 7/2000 | Burton |
| RE36,843 E | 8/2000 | Lake et al. |
| 6,136,468 A | 10/2000 | Mitchell, Jr. et al. |
| 6,157,858 A | 12/2000 | Gross et al. |
| 6,186,982 B1 | 2/2001 | Gross et al. |
| 6,187,475 B1 | 2/2001 | Oh et al. |
| 6,200,704 B1 | 3/2001 | Katz et al. |
| 6,208,524 B1 | 3/2001 | Tuttle |
| 6,235,422 B1 | 5/2001 | Kaplan et al. |
| 6,243,192 B1 | 6/2001 | Mitchell, Jr. et al. |
| 6,273,904 B1 | 8/2001 | Chen et al. |
| 6,277,520 B1 | 8/2001 | Moutsios et al. |
| 6,317,630 B1 | 11/2001 | Gross et al. |
| 6,369,793 B1 | 4/2002 | Parker |
| 6,379,835 B1 | 4/2002 | Kucherovsky et al. |
| 6,395,043 B1 | 5/2002 | Shadle et al. |
| 6,421,561 B1 | 7/2002 | Morris |
| 6,458,234 B1 | 10/2002 | Lake et al. |
| 6,503,658 B1 | 1/2003 | Klein et al. |
| 6,569,572 B1 | 5/2003 | Ochiai et al. |
| 6,576,364 B1 | 6/2003 | Mitchell, Jr. et al. |
| 6,643,532 B2 | 11/2003 | Axelgaard |

(56) References Cited

U.S. PATENT DOCUMENTS

| | | | |
|---|---|---|---|
| 6,653,014 B2 | 11/2003 | Anderson et al. |
| 6,664,006 B1 | 12/2003 | Munshi |
| 6,676,021 B1 | 1/2004 | Luski et al. |
| 6,676,714 B2 | 1/2004 | Langan |
| 6,697,694 B2 | 2/2004 | Mogensen |
| 6,708,050 B2 | 3/2004 | Carim |
| 6,709,778 B2 | 3/2004 | Johnson |
| 6,729,025 B2 | 5/2004 | Farrell et al. |
| 6,740,451 B2 | 5/2004 | Christian et al. |
| 6,743,546 B1 | 6/2004 | Kaneda et al. |
| 6,752,842 B2 | 6/2004 | Luski et al. |
| 6,757,560 B1 | 6/2004 | Fischer et al. |
| 6,816,125 B2 | 11/2004 | Kuhns et al. |
| 6,836,215 B1 | 12/2004 | Laurash et al. |
| 6,838,209 B2 | 1/2005 | Langan et al. |
| 6,855,441 B1 | 2/2005 | Levanon |
| 6,884,546 B1 | 4/2005 | Fujita et al. |
| 6,888,502 B2 | 5/2005 | Beigel et al. |
| 6,899,976 B2 | 5/2005 | Larson et al. |
| 6,915,159 B1 | 7/2005 | Kuribayashi et al. |
| 7,017,822 B2 | 3/2006 | Aisenbrey |
| 7,022,431 B2 | 4/2006 | Shchori et al. |
| 7,031,768 B2 | 4/2006 | Anderson et al. |
| 7,043,297 B2 | 5/2006 | Keusch et al. |
| 7,049,962 B2 | 5/2006 | Atherton et al. |
| 7,224,280 B2 | 5/2007 | Ferguson et al. |
| RE39,676 E | 6/2007 | Nitzan |
| 7,238,196 B2 | 7/2007 | Wibaux |
| 7,244,326 B2 | 7/2007 | Craig et al. |
| 7,294,209 B2 | 11/2007 | Shakespeare |
| 7,320,845 B2 | 1/2008 | Zucker |
| 7,335,441 B2 | 2/2008 | Luski et al. |
| 7,340,297 B2 | 3/2008 | Tamarkin et al. |
| 7,340,310 B2 | 3/2008 | Nitzan et al. |
| 7,348,096 B2 | 3/2008 | Schubert et al. |
| 7,364,896 B2 | 4/2008 | Schembri |
| 7,368,191 B2 | 5/2008 | Andelman et al. |
| 7,383,083 B2 | 6/2008 | Fischer et al. |
| 7,394,382 B2 | 7/2008 | Nitzan et al. |
| 7,483,738 B2 | 1/2009 | Tamarkin et al. |
| 7,491,465 B2 | 2/2009 | Nitzan et al. |
| 7,501,208 B2 | 3/2009 | Feddrix et al. |
| 7,599,192 B2 | 10/2009 | Pennaz et al. |
| 7,603,144 B2 | 10/2009 | Jenson et al. |
| 7,625,664 B2 | 12/2009 | Schubert et al. |
| 7,643,874 B2 | 1/2010 | Nitzan et al. |
| 7,652,188 B2 | 1/2010 | Levanon et al. |
| 7,727,290 B2 | 6/2010 | Zhang et al. |
| 8,268,475 B2 | 9/2012 | Tucholski |
| 8,574,754 B2 | 11/2013 | Tucholski |
| 2002/0086215 A1 | 7/2002 | Tamura et al. |
| 2002/0095780 A1 | 7/2002 | Shadle et al. |
| 2002/0110733 A1 | 8/2002 | Johnson |
| 2002/0182485 A1 | 12/2002 | Anderson et al. |
| 2002/0192542 A1 | 12/2002 | Luski et al. |
| 2003/0014014 A1 | 1/2003 | Nitzan |
| 2003/0059673 A1 | 3/2003 | Langan et al. |
| 2003/0082437 A1 | 5/2003 | Sotomura |
| 2003/0165744 A1 | 9/2003 | Schubert et al. |
| 2003/0187338 A1 | 10/2003 | Say et al. |
| 2003/0219648 A1 | 11/2003 | Zucker |
| 2003/0232248 A1 | 12/2003 | Iwamoto et al. |
| 2004/0001998 A1 | 1/2004 | Hopkins et al. |
| 2004/0018422 A1 | 1/2004 | Islam et al. |
| 2004/0053124 A1 | 3/2004 | LaFollette et al. |
| 2004/0170893 A1 | 9/2004 | Nakaishi et al. |
| 2004/0170896 A1 | 9/2004 | Murata et al. |
| 2004/0175609 A1* | 9/2004 | Yageta ............... H01M 2/0202 429/82 |
| 2004/0209160 A1 | 10/2004 | Luski et al. |
| 2004/0217865 A1 | 11/2004 | Turner |
| 2004/0267189 A1 | 12/2004 | Mavor et al. |
| 2004/0267190 A1 | 12/2004 | Tamarkin et al. |
| 2004/0267283 A1 | 12/2004 | Mavor et al. |
| 2005/0013783 A1 | 1/2005 | Perricone |
| 2005/0038473 A1 | 2/2005 | Tamarkin et al. |
| 2005/0085751 A1 | 4/2005 | Daskal et al. |
| 2005/0147880 A1 | 7/2005 | Takahashi et al. |
| 2005/0194454 A1 | 9/2005 | Ferber et al. |
| 2005/0260492 A1 | 11/2005 | Tucholski et al. |
| 2006/0001528 A1 | 1/2006 | Nitzan et al. |
| 2006/0007049 A1 | 1/2006 | Nitzan et al. |
| 2006/0012464 A1 | 1/2006 | Nitzan et al. |
| 2006/0131616 A1 | 6/2006 | Devaney et al. |
| 2006/0159899 A1 | 7/2006 | Edwards et al. |
| 2006/0211936 A1 | 9/2006 | Hu et al. |
| 2006/0216586 A1 | 9/2006 | Tucholski |
| 2006/0227669 A1 | 10/2006 | Pennaz et al. |
| 2006/0253061 A1 | 11/2006 | Anderson et al. |
| 2006/0264804 A1 | 11/2006 | Karmon et al. |
| 2007/0007661 A1 | 1/2007 | Burgess et al. |
| 2007/0011870 A1 | 1/2007 | Lerch et al. |
| 2007/0016277 A1 | 1/2007 | Karat et al. |
| 2007/0024425 A1 | 2/2007 | Nitzan et al. |
| 2007/0060862 A1 | 3/2007 | Sun et al. |
| 2007/0066930 A1 | 3/2007 | Tanioka et al. |
| 2007/0243459 A1 | 10/2007 | Jenson et al. |
| 2008/0007409 A1 | 1/2008 | Ferry et al. |
| 2008/0021436 A1 | 1/2008 | Wolpert et al. |
| 2008/0091095 A1 | 4/2008 | Heller et al. |
| 2008/0174380 A1 | 7/2008 | Nitzan et al. |
| 2008/0213664 A1 | 9/2008 | Krasnov et al. |
| 2008/0218345 A1 | 9/2008 | Nitzan et al. |
| 2008/0272890 A1 | 11/2008 | Nitzan et al. |
| 2010/0081049 A1 | 4/2010 | Holl et al. |
| 2010/0196744 A1 | 8/2010 | Tucholski et al. |
| 2010/0209756 A1 | 8/2010 | Bailey et al. |
| 2010/0266895 A1* | 10/2010 | Tucholski ............. H01M 6/005 429/185 |
| 2011/0311857 A1 | 12/2011 | Tucholski |
| 2012/0107666 A1 | 5/2012 | Bailey et al. |

FOREIGN PATENT DOCUMENTS

| | | |
|---|---|---|
| EP | 0862227 A1 | 9/1998 |
| EP | 1026767 A1 | 8/2000 |
| EP | 1096589 A1 | 5/2001 |
| EP | 1107336 A2 | 6/2001 |
| JP | 55-133770 A | 10/1980 |
| JP | 58-206048 A | 12/1983 |
| JP | 59-228353 A | 12/1984 |
| JP | 61-55866 A | 3/1986 |
| JP | 61-64077 A | 4/1986 |
| JP | 62-126557 A | 6/1987 |
| JP | 62-165875 A | 7/1987 |
| JP | 62-165876 A | 7/1987 |
| JP | 62-285954 A | 12/1987 |
| JP | 63-81762 A | 4/1988 |
| JP | 63-119155 A | 5/1988 |
| JP | 64-24364 A | 1/1989 |
| JP | 2-273464 A | 11/1990 |
| JP | 4-276665 A | 10/1992 |
| JP | 5-217587 A | 8/1993 |
| JP | 5-225989 A | 9/1993 |
| JP | 5-275087 A | 10/1993 |
| JP | 2000-164033 A | 6/2000 |
| JP | 2000-229128 A | 8/2000 |
| JP | 2000-319381 A | 11/2000 |
| JP | 2001-23695 A | 1/2001 |
| JP | 2001-521676 A | 11/2001 |
| JP | 2003-151634 A | 5/2003 |
| JP | 2003-282148 A | 10/2003 |
| JP | 2004-336240 A | 11/2004 |
| JP | 2005-39256 A | 2/2005 |
| JP | 2005149783 | 6/2005 |
| JP | 2008-171599 A | 7/2008 |
| JP | 2008-171732 A | 7/2008 |
| JP | A2008535194 | 8/2008 |
| JP | 2008536262 | 9/2008 |
| JP | A2011508384 | 3/2011 |
| TW | 540185 B | 7/2003 |
| WO | 96/38867 A1 | 12/1996 |
| WO | 97/17735 A1 | 5/1997 |
| WO | 98/48469 A1 | 10/1998 |

(56) References Cited

FOREIGN PATENT DOCUMENTS

| WO | 00/36672 A1 | 6/2000 |
|---|---|---|
| WO | 03/069700 A2 | 8/2003 |
| WO | 2005/101973 A2 | 11/2005 |
| WO | 2006/003648 A2 | 1/2006 |
| WO | WO2006105966 | 10/2006 |
| WO | 2009/018315 A2 | 2/2009 |
| WO | WO2009085950 | 7/2009 |

OTHER PUBLICATIONS

Acheson Industries, "Acheson Electrical Materials," from www.achesonindustries.com, dated Nov. 24, 2009.

Advanced Coatings and Chemicals, "Technical Data Sheet," Temple City, CA.

Hartman, Lauren R., "Flexibles stay resilient," Packaging Digest, Mar. 1, 2005.

Linden, D., Handbook of Batteries and Fuel Cells, pp. 5.5-5.7, McGraw-Hill, Inc., 1984.

Linden, D., Handbook of Batteries, Second Edition, pp. 8.8-8.9, McGraw-Hill, Inc., 1995.

Omnexus Adhesives & Sealant Solutions, "Ethylene Vinyl Acetate (EVA) and Other Hot Melts," from http://www.omnexus4adhesives.com/bc/construction-channel/index.aspx?id=ethylene.

International Search Report for Application No. PCT/US13/72259, dated Mar. 14, 2014.

Supplementary European Search Report for Corresponding Application No. PCT/US2013/72259; Dated Oct. 13, 2015.

* cited by examiner

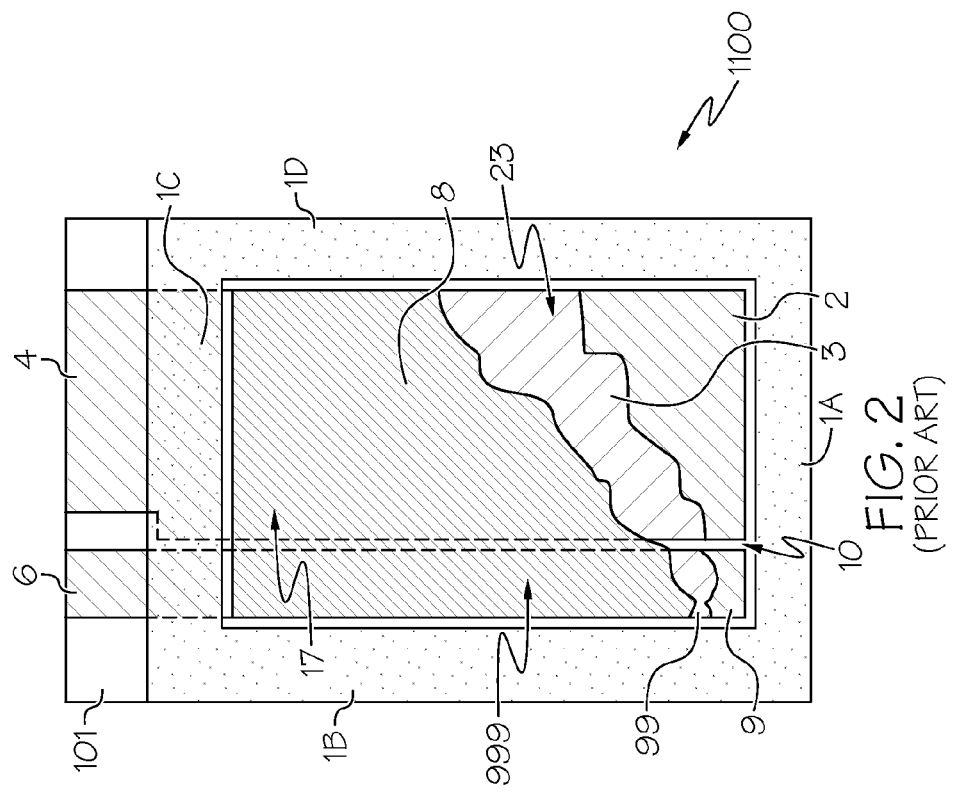
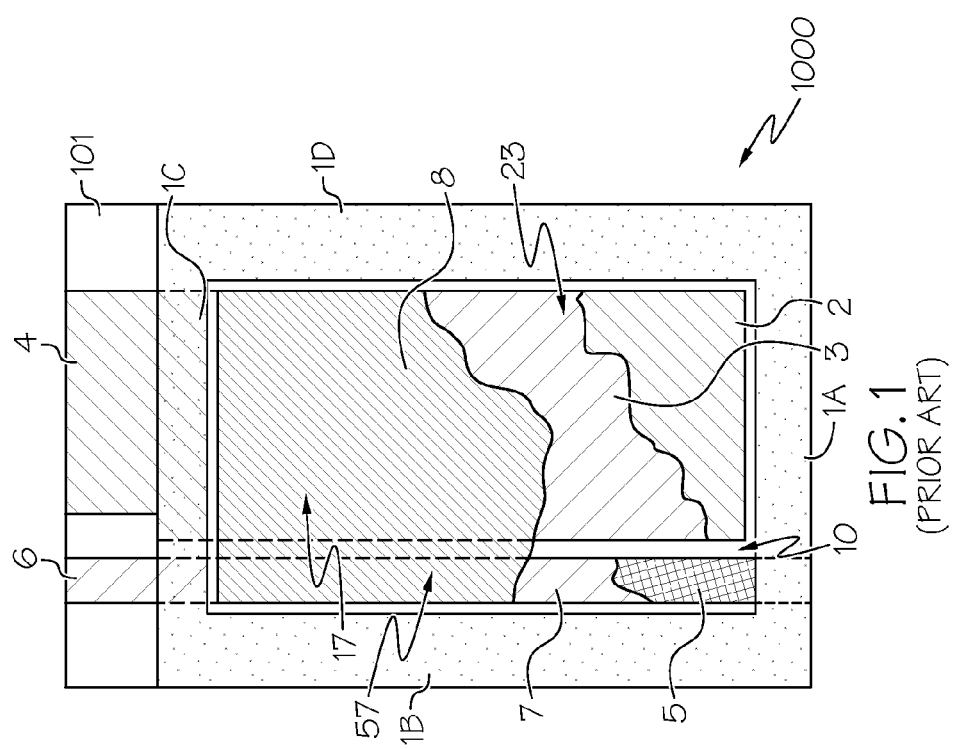

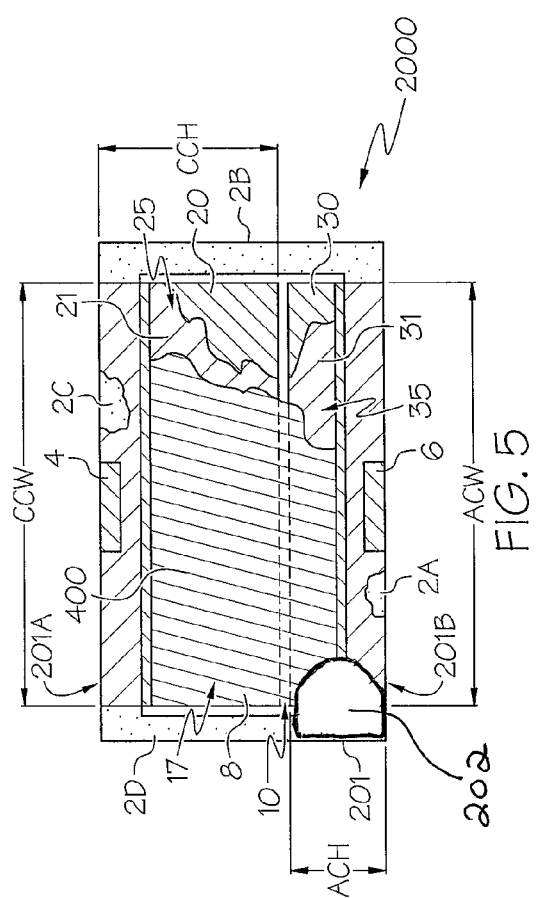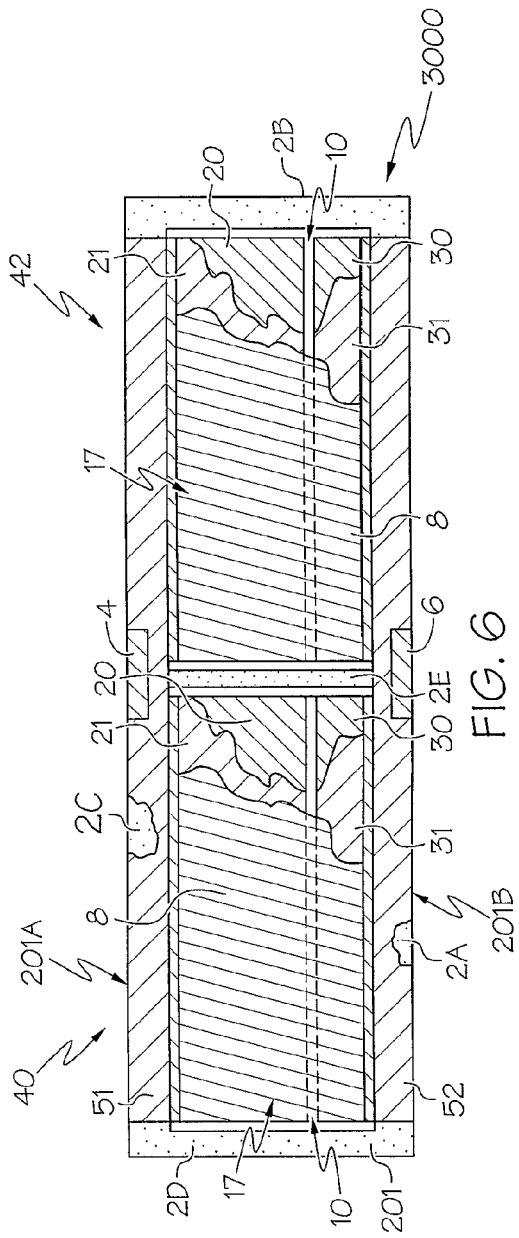

BATTERY CELL CONSTRUCTION

CROSS-REFERENCE TO RELATED APPLICATIONS

This application claims the benefit of U.S. provisional application Ser. No. 61/730,083, filed on Nov. 27, 2012, which is incorporated herein in its entirety by reference thereto.

FIELD OF THE INVENTION

The present invention relates generally to an electrochemical cell or battery, and more specifically to a high current thin electrochemical cell and method of manufacturing said electrochemical cell.

BACKGROUND OF THE INVENTION

In the past 100 years or so, electrical or electronic circuits, have seen a dramatic change in their design and their assembly process. About 100 years ago, DC powered circuits were hard wired and hand soldered in a box format. The high current electronic or electrical components were fastened to the box and then they were manually connected by hand soldering wire of sufficient diameter to carry the required currents and voltages. In many of these circuits the large sized, multi voltage batteries were placed in a battery compartment and then they were also hand soldered into the circuit. Typical battery sizes could be a 6 volt lantern battery or a battery pack made of multiple 6" size unit cells or even possibly some smaller sizes. When the batteries were depleted, they were desoldered and replaced in the same manner as when the circuit was made.

About 60 years ago with the invention of the transistor and other electronic parts, the design and manufacturing of circuits changed drastically. Due to the electronic changes, which required much lower currents and many times lower voltages, circuits could be made in a more efficient and compact manner. This allowed circuits to be made on a circuit board in a wave soldering method. As part of this wave soldering assembly method, battery holders were also included into the circuit. Due to the big reduction in required voltages and currents the power source size could also be reduced in size. Typical power sizes could now be D, C, AA, AAA, transistor 9 volt battery or even coin or button cells. In these new circuits with the battery holder, the consumer could install the battery when he begins using the device as well making it very easy to replace the depleted batteries.

In recent years, as described in several Blue Spark patent applications, printed electronics on flexible substrates has become a new process and is growing in popularity. In this process, some or all of the circuit is printed as well as some of the electronic components. Typically this type of circuit could include a display, IC chip, sensor, antennae, lights and a relatively low capacity power source such as a flat printed battery. In some applications, the power source could also be printed in a totally integrated manner.

Alternatively, the power source can be integrated in a different manner. In order to reduce costs, the power source can be a printed or otherwise constructed as a flat battery that is provided as a complete cell or battery for later integration into the desired circuit. A typical cell can provide, for example, about 1.5 volts DC. Where greater voltages are required, it is conventionally known to connect two or more cells in series to increase the voltage. Similarly, multiple cells can be connected together in parallel to increase the effective capacity. For example, a battery can include two cells electrically connected in series to provide 3 volts DC. Still, it is desirable to reduce the overall size of the battery, even with multiple cells, for use in small circuits. Various designs and methods of manufacture of a flat cell and batteries are described in co-pending U.S. application Ser. No. 11/110,202 filed on Apr. 20, 2005, Ser. No. 11/379,816 filed on Apr. 24, 2006, Ser. No. 12/809,844 filed on Jun. 21, 2010, Ser. No. 13/075,620 filed on Mar. 30, 2011, Ser. No. 13/625,366 filed on Sep. 24, 2012, and Ser. No. 13/899,291 filed on May 21, 2013, as well as issued U.S. Pat. Nos. 8,029,927, 8,268,475, 8,441,411, 8,574,745 all of which are incorporated herein by reference.

With the growing market needs for low cost, low capacity thin flat cells, it would be beneficial to produce a thin, flat, printable flexible cell that is versatile and inexpensive to mass-produce. Printable, disposable thin cells that are well suited for low-power and high-production volume applications would be useful, especially if they offer adequate voltage, sufficient capacity, rate capability, and low-cost solutions. Conventional low-profile batteries typically have few of these attributes, if any.

Furthermore, in recent years there has been a growing need for various electronic devices, such as active RFID tags, sensors with RFID tags, skin patches with sensors to detect body temperature, as well as electronics to log and wirelessly transmit and/or receive such data, skin patches that deliver iontophoretic or other electrical functionality, etc. These various electronic devices can have various electrical loading characteristics. Thus, it can be beneficial to provide thin flat power sources that can reliably deliver relatively higher currents. In one example, the thin flat power sources can be separately manufactured and later electrically coupled to various electronic devices. In another example, the manufacture of the thin flat power sources can be integrated with the manufacture of the desired circuitry of electrical components to power the components.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a flexible battery includes at least one electrochemical cell for generating an electrical current, the battery including a first substrate including a pair of opposed side portions and a second substrate. A cathode collector layer is provided on the first substrate between the pair of opposed side portions and being formed of a dried or cured ink, and a cathode layer provided on the cathode collector layer and is formed of a dried or cured ink. An anode layer is provided on the first substrate between the pair of opposed side portions, wherein the cathode and anode layers are disposed in a co-planar arrangement. An electrolyte layer includes a liquid electrolyte in contact with both of the cathode layer and the anode layer, wherein the first substrate is connected and sealed to the second substrate to form an inner space containing the electrolyte, and also containing at least a major portion of the cathode layer and the anode layer within the inner space. A first electrode contact is provided that is electrically coupled to the cathode collector layer and is disposed along one of the pair of opposed side portions of the first substrate, and a second electrode contact is provided that is electrically coupled to the anode layer and is disposed along the other of the pair of opposed side portions of the first substrate. The cathode collector layer includes a geometry having a height and a width such that the number of squares is approximately 5 or less. The number of squares is determined by dividing the cathode collector layer height extending in a direction between the pair of opposed side portions by the cathode collector layer width extending in a direction along one of the pair of opposed side portions of the first substrate.

In accordance with another aspect of the present invention, a flexible battery includes at least two electrochemical cells for generating an electrical current, the battery including a first substrate including a pair of opposed side portions and a second substrate. A first electrochemical cell is provided on the first substrate, including a first cathode collector layer, a first cathode on the first cathode collector layer, and a first anode, wherein the first cathode collector layer is provided on the first substrate between the pair of opposed side portions. A second electrochemical cell is provided on the first substrate, including a second cathode collector layer, a second cathode on the second cathode collector layer, and a second anode, wherein the second cathode collector layer is provided on the first substrate between the pair of opposed side portions. First and second liquid electrolytes are provided, respectively, in contact with the first and second electrochemical cells, wherein the second substrate layer is connected to the first substrate layer to form first and second inner spaces, respectively, containing each of said first and second liquid electrolytes. A first electrical bridge is provided that electrically couples the first electrochemical cell to the second electrochemical cell in a parallel arrangement. A first electrode contact is provided that is electrically coupled to the first cathode collector layer and is disposed along one of the pair of opposed side portions of the first substrate, and a second electrode contact that is electrically coupled to the first anode layer and is disposed along the other of the pair of opposed side portions of the first substrate. Each of the first and second cathode collector layers includes a geometry having a height and a width such that the number of squares is approximately 5 or less, respectively. The number of squares is determined by dividing the respective cathode collector layer height extending in a direction between the pair of opposed side portions by the respective cathode collector layer width extending in a direction along one of the pair of opposed side portions of the first substrate.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1 shows one example prior art battery construction;

FIG. 2 shows another example prior art battery construction;

FIG. 5 shows one new example battery construction according to an aspect of the instant application;

FIG. 6 shows another new example battery construction according to another aspect of the instant application;

DESCRIPTION OF EXAMPLE EMBODIMENTS

Figure 3:
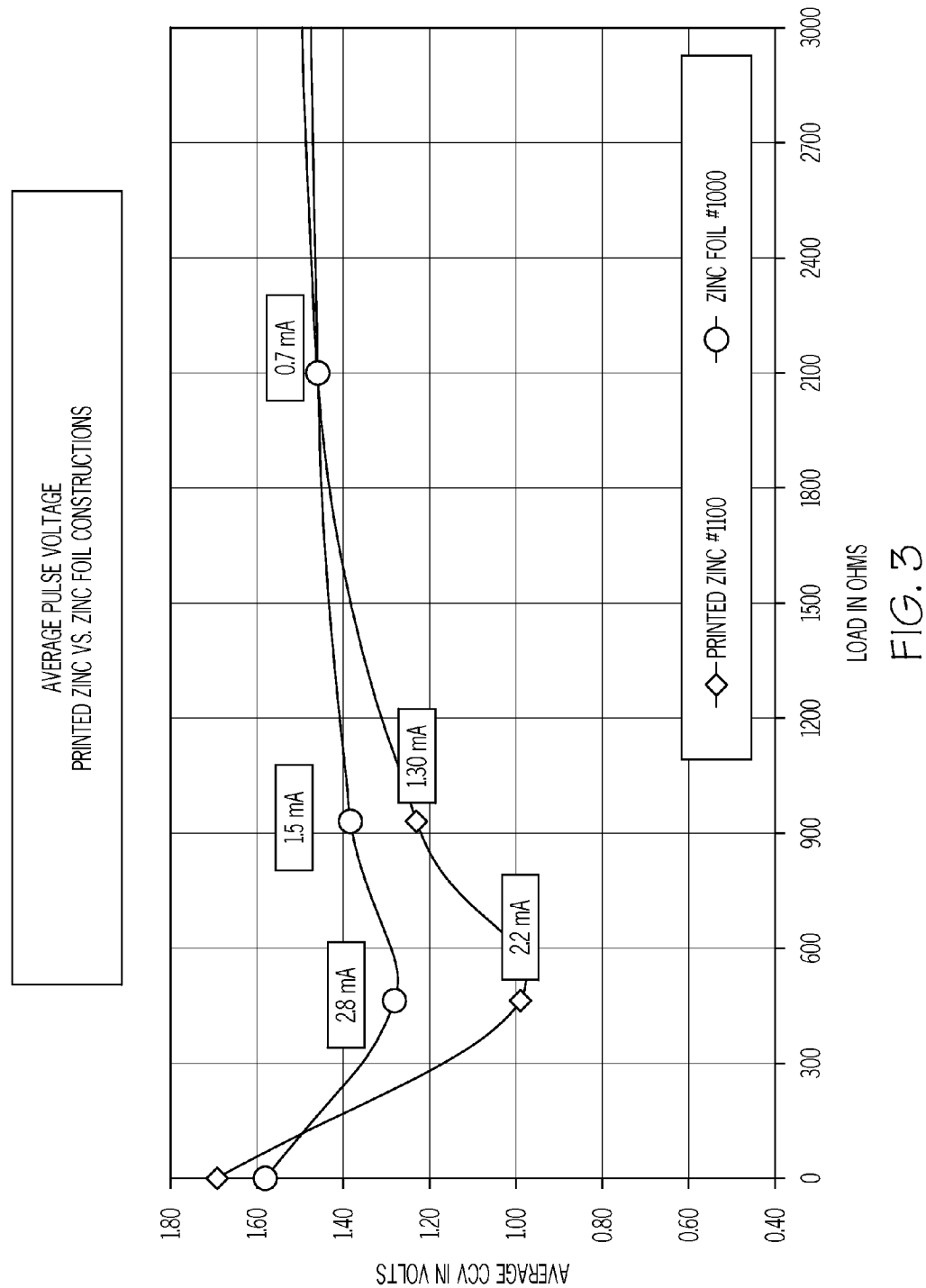
FIG. 3 shows a chart illustrating experimental results using the batteries of FIGS. 1-2 in a first experimental regime.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Generally, this application relates to a high current thin electrochemical cell and methods of manufacturing said electrochemical cell. Although the concepts herein are expressed with an example battery using a co-planar construction, they could also be used with co-facial cell designs in various geometries.

For the past 100 years or so, dry cells have been made with various types of chemical systems that include Alkaline Zn/MnO2, C/Zn with various electrolytes, Li/MnO2 and others. Also, for the most part these cells have been in various geometrical shapes that include cylindrical, prismatic, and thin flat structures. In these conventional constructions, the cells as well as the electrodes were tall and narrow. When greater capacity and/or greater rate capability was required, cell designers just made these packages larger. If less capacity was required, the cells were just made smaller. Since this design criteria was successful, when printed thin flat cell were introduced about 15-20 years ago, the same design criteria was used with some success. Recently, the challenge of designing smaller cells with high drain capabilities, different design criteria was needed. This new criteria is explained in the following paragraphs.

In making printed thin flat cells with a printed anode, Applicant has learned that conventional "tall and narrow cells and electrodes" (i.e., see FIGS. 1-2) could be changed, if cell performance for drain rates and discharge efficiencies were to be functional and efficient at different drain rates. Thin printed cells, for the most part, use inks for the electrode collectors and electrodes and these inks are usually less conductive than metallic parts found in the other constructions and in Applicant's early cells, which had a zinc foil anode. When tall and narrow cells with tall and narrow electrodes are made, the cells internal resistance could be high, thus it becomes a potential barrier for high currents and high discharge efficiencies. The cell's internal resistance is due to many items, such as: (A) electrolyte conductivity; (B) separator resistance; (C) resistance of both electrodes; and (D) resistance of both electrode collectors.

Generally, the first two items (A and B) are relatively smaller factors, while the last two items (C and D) including the resistance of the both electrodes and the resistance of both collectors are relatively larger factors contributing to the cell's overall resistance. The electrodes and collectors conductivity are normally lower than with metallic parts since these inks are conductive powders mixed with non-conductive binders and other materials. Applicant has now discovered that an even bigger factor related to high currents and high discharge efficiencies may be the geometry of the electrodes and their collectors.

FIGS. 1-2 illustrate conventional battery constructions to describe this reason and their effect of high resistances, and how they could be easily reduced. FIG. 1 shows a top view of one example of Applicant's convention cell 1000. Various designs and methods for manufacturing of a flat cell and batteries are described in Applicant's co-pending U.S. application Ser. No. 11/110,202 filed on Apr. 20, 2005, Ser. No. 11/379,816 filed on Apr. 24, 2006, Ser. No. 12/809,844 filed on Jun. 21, 2010, Ser. No. 13/075,620 filed on Mar. 30, 2011, Ser. No. 13/625,366 filed on Sep. 24, 2012, and Ser. No. 13/899,291 filed on May 21, 2013, as well as issued U.S. Pat. Nos. 8,029,927, 8,268,475, 8,441,411, 8,574,745, all of which are incorporated herein by reference.

Conventional cell 1000 features a bottom, first substrate 101, which is the base of the construction and can be a five ply laminated structure. For clarity of this description, the top cover is not shown (although it can be similar to the bottom layer/cover). On the topside of substrate 101, a carbon cathode collector layer 2 is printed on part of the substrate 101. This cathode collector layer 2 extends from the inside of the bottom seal 1A to the top of the cell 1000 and forming the positive contact 4. Just before the contact area 4, the cathode collector layer 2 passes under the top seal 1C. After the cathode collector layer 2 is thoroughly dried, a cathode 3 is printed over the collector area that is inside of the seal area, which is formed by the inside edges of the four seal edges 1A, 1B, 1C, and 1D. These two items cathode collector layer 2 and cathode 3 form the cathode-cathode assembly 23. Adjacent to cathode-collector assembly 23, is the anode assembly 57 is laminated to the substrate 101. Applicant's conventional cells used a zinc foil anode strip 7, which was laminated to a double-sided pressure adhesive 5. The present manufacturing process dictates that the anode—collector assembly layer extends from the bottom of the cell to the top of the cell 1000 beyond the top seal 1C forming the negative contact 6. After this anode subassembly 57 was made, the bottom release liner was removed and the anode subassembly 57 was laminated to the cells substrate 101 just adjacent (approximately 0.060" gap 10) to the cathode-collector assembly 23. After the electrodes are in place, a separator 8 is placed over the anode assembly 57 and cathode assembly 23 and inside of the seal area. The separator is typically smaller than the inside of the seal area. Then an electrolyte 17 such as a 27% aqueous solution of ZnCl2 is added to cell 1000 separator 8. In the case of this example cell, the cathode-collector assembly was approximately 2.80" tall and approximately 0.95" wide, and the anode for this cell was approximately 0.20" wide and approximately 2.80" tall (this does not include the area in the bottom seal area 1A).

FIG. 2 shows an alternate cell construction with a printed anode assembly 999, instead of the zinc foil anode strip described above. Cell 1100 of FIG. 2 uses a printed zinc anode 99, which is printed over anode collector 9, and the anode width is increased to approximately 0.270" wide. All of the items are the same or similar to those in FIG. 1, except for the printed anode assembly 999 with the printed carbon anode collector 9 and printed anode 99. Both of the anode collector 9 and cathode collector 2 can be printed at the same time (or even at different times), and can use the same inks as used for the cathode collector 2 of cell 1000.

Surface resistivity, which is also known as "sheet resistance," is expressed in ohms per square. The sheet resistance is a measurement of resistance of thin films that have a generally uniform thickness. Sheet resistance is applicable to two-dimensional systems where the thin film is considered to be a two dimensional entity. It is analogous to resistivity as used in three-dimensional systems. When the term sheet resistance is used, the current must be flowing along the plane of the sheet, and not perpendicular to it.

The conductive height is the distance that current has to travel between regions (top to bottom) of the cathode collector and of the anode collector to the respective electrode contact. By essentially decreasing the conductive height, lower cell internal resistance results. In addition, the currents can be higher because the resistance of the cathode collector is relatively lower. The resistance is lower because the number of squares is reduced. The resistance of the cathode collector from its bottom to its top, including the positive contact, can be determined by calculating the number of squares in the cathode collector. The number of squares is determined by dividing the collector height, by the narrowest width of the collector area. The number of squares using the new cell designs herein is greatly reduced as compared to that of a similarly sized cell using the standard construction. For example, the number of squares of the instant application can be generally equal to three or less. In another example, the number of squares of the instant application can be generally equal to one or less.

Conductive inks are normally characterized in the industry by their conductivity in terms of ohms/square at one mil of dry thickness. The resistance of these two electrodes in this example cell size (i.e., FIGS. 1-2) can be calculated in the following manner. Each electrode collector assembly is approximately 2.80" tall (7.1 cm) with the cathode collector 2 being approximately 0.95" wide (2.43 cm), and the zinc foil anode is also approximately 2.80" tall (7.1 cm) and approximately 0.20" (0.51 cm) wide. In cell 1000 of FIG. 1, the cathode collector has approximately 2.9 squares and the anode collector has approximately 14.0 squares. The resistivity of the carbon ink collector which has a dry thickness of approximately 0.001" is approximately 33 ohms per Square (as measured by Applicant). This means that the theoretical resistance of the cathode collector is approximately 96 ohms (33 ohms/square×2.9 squares). The anode has a very highly conductive zinc foil with a resistivity of approximately $5.5 \times 10^{-4}$ ohms/cm (handbook value). The calculation for the anode resistance is as follows: Anode resistance=(height/surface area of the entire collector)×Resistivity. Using the above example values, the example calculation is as follows: $(7.1 \text{ cm}/(7.1 \times 0.51)) \times 5.5 \times 10^{-4}$=approximately 0.00108 ohms (theoretical).

Due to many factors such as zinc purity, surface contamination, measuring techniques, and instrument contact resistance, the anode resistance was actually measured by Applicant to be approximately 1-2 ohms, using a Fluke brand multi-meter. Now when the cell has a printed zinc ink, its resistance is usually greater than the anode with the zinc foil. Typical resistances for anodes as described in FIG. 2 are calculated as follows: 2.8" tall/0.27" wide (wider than zinc foil) or approximately 10.4 squares. The printed zinc ink resistivity is approximately 225 ohms/square at 1 mil thickness (as measured by Applicant); therefore, the anode resistance is calculated as follows: 10.4 squares×approximately 225 ohms/square @ 1 mil thick/6 mils thick=approximately 390 ohms. It is noted that the resistivity of 225 ohms/square occurs at 1 mil thickness of the material, and that the resistivity decreases with a thicker material. Printed anodes are typically thicker than foil anodes due to the porosity of the print, because of printing process, the binder and the carbon used in the formula. Here, the anode was approximately 6 mils thick, which is reflected in the above calculation by reducing the resistance by a corresponding factor of 6.

Figure 4:
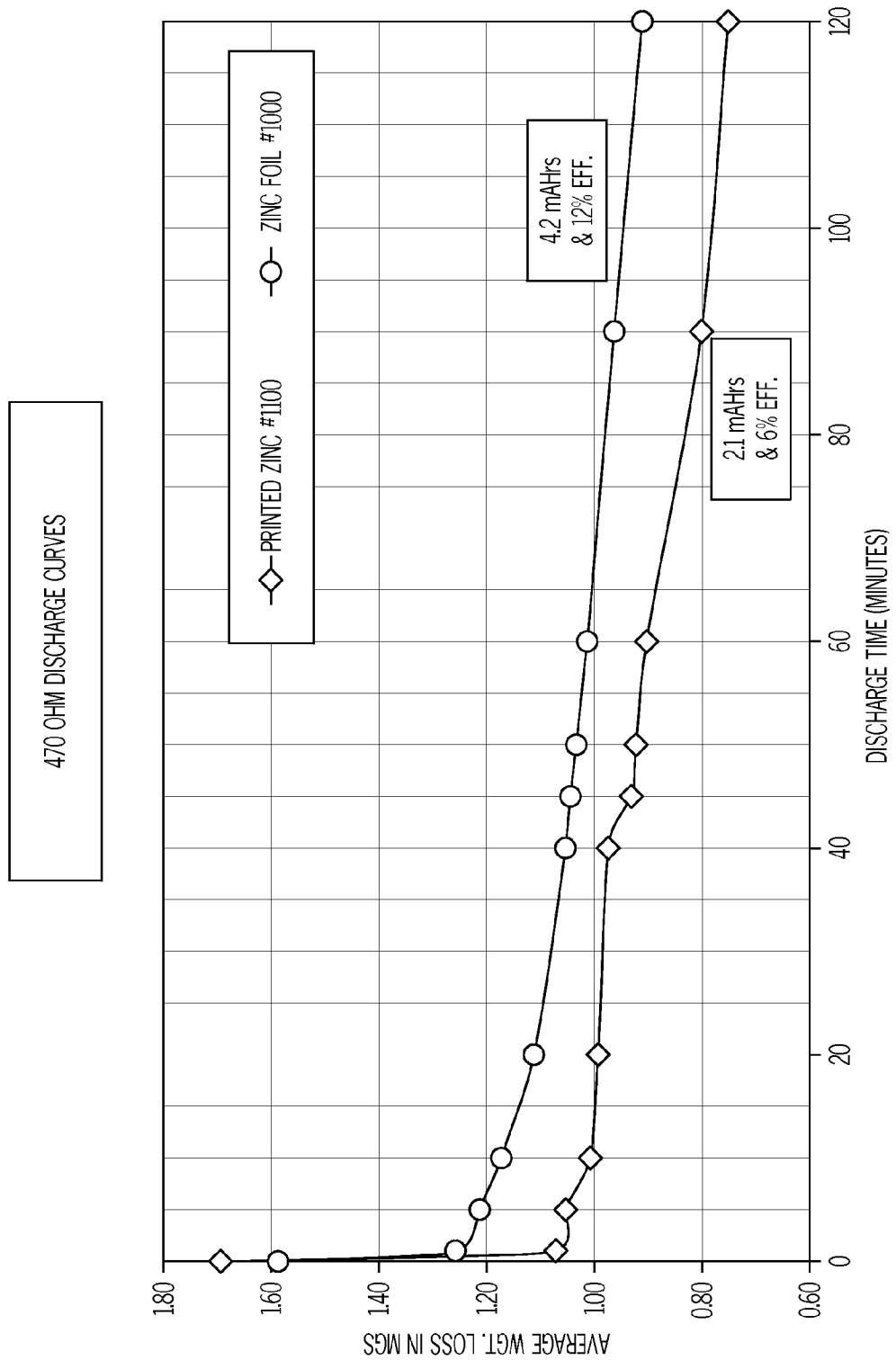
FIG. 4 shows a chart illustrating experimental results using the battery of FIGS. 1-2 in a second experimental regime.

Turning now to FIGS. 3-4, a comparison of the cell performance of FIGS. 1-2 is illustrated. The cell performance in FIG. 3 (the average cell closed circuit voltage (CCV) at approximately 2 sec pulse voltage at various loads) and FIG. 4 (continuous discharge at a load of 470 ohms) or about an average current of about 2 mA, which is a very high drain rate for this small cell) is illustrated between cell 1000 in FIG. 1 with zinc foil and cell 1100 in FIG. 2 with printed zinc. The experimental data was tabulated from experiments done at room temperature. FIG. 4 also shows discharge efficiencies for the two compared cells 1000, 1100. FIG. 3 shows cells 1000 (zinc foil anode) of FIG. 1 on the high drain rates have a much higher pulse voltages and currents than the cells 1100 (printed zinc) of FIG. 2; however as the load is decreased to about 2100 ohms or about 0.7 mA, there is no difference between the two, thus showing that the cell electrode resistance is not a large factor for lower currents. FIG. 4 shows the cells 1000 of FIG. 1 made with a zinc foil anode assembly 57 have a much higher operating voltage for the entire test as well as twice the operating time to 0.90 volts, twice the output capacity and twice the discharge efficiency than the cells of the cells 1100 of FIG. 2 with a printed zinc anode. Both of these cell constructions have an active area of approximately 2.66 sq. inches. Since printed zinc has many advantages over a zinc foil anode, it would be advantageous to make these cells capable of higher drain rates and high discharge efficiencies. These advantages include lower cost, easier to process, more design freedom that would allow many more shapes and sizes. Based on the above, it appears that lower electrode and collector resistances would help this situation.

Applicant has now discovered that an even bigger factor related to relatively higher currents and higher discharge efficiencies may be the geometry of the electrodes and their collectors. Applicant has further discovered that minimizing the number of squares in a cell appears to be a beneficial and relatively easy-to-implement method to accomplish this goal. The following is verification of this concept. By using a new design criteria described herein of electrodes being short and wide, instead of tall and narrow, the electrode-collector resistances are greatly reduced; therefore this design will produce relatively higher drain rates and higher discharge efficiencies as compared to the conventional cells. It is understood that although the new cells are described herein as "short and wide," this description is done for convenience with respect to the illustrated embodiments, and is not intended to be a limitation upon the instant application. The new cell design could utilize various geometries as desired, including circular, oval, square, and polygonal, etc.

The batteries described herein are illustrated using a co-planar construction. A co-planar construction provides several advantages, in that they are relatively easier to manufacture, provide consistent, reliable performance, and provide external contacts that are on the same plane. Initially thin printed cells were designed primarily as a power sources that supply relatively low levels of current, now there is an increasing need for a thin flat power sources that can reliably deliver currents higher than those provided by the standard co-planar electrochemical cell construction. Due to the need for thin flat power sources that can reliably deliver higher currents, constructions were sought that had the same advantages as the earlier co-planar cells/batteries, but could also deliver higher currents. As shown in FIGS. 5-6, a top view of example new short-and-wide battery construction is illustrated that is capable of delivering higher currents, as well as other significant performance advantages. These generally include one or more of the following; such as lower cathode collector resistance; lower cell internal resistance which results in higher pulse voltages on the same load; a pulse voltage improvement that is larger as the current becomes higher; an increased operating time to high voltage cutoffs on higher drain tests and/or higher discharge efficiencies. The new designed electrochemical cell was also designed to be easily made by printing (e.g., through use of a printing press), and allows, for example, for the cell/battery to be directly integrated with an electronic application.

Turning now to FIG. 5, a top view illustrates one example new cell design 2000. For clarity the top cover is not shown (although it can be similar to the bottom layer/cover). Cell 2000 features substrate 201, which is the same or similar substrate as used in cells 1000 and 1100, as the base of the construction. On top of substrate 201 a carbon cathode collector layer 20 is printed on part of the substrate 201. This collector is approximately 1.0" wide and extends from near the middle of the cell that leaves a gap 10 that is about 0.060" from the anode collector 30. This cathode collector layer 20 also extends under the top seal 2C to form the positive contact 4, which is located along side 201A. It is contemplated that the cathode collector layer 20 could also extend under either or both of the side seals 2B, 2D to provide a slightly wider layer that could further reduce electrical resistance. After the collector is thoroughly dried, a cathode 21 is printed over the collector area that is inside of the seal area 400, which is approximately 0.825 sq. inches and is about 0.050" away from the inside edges of the three seal edges 2B, 2C, and 2D (although other dimensions are contemplated). These two items 20 and 21 form the cathode-cathode collector assembly 25. Similarly, the anode collector 30 and anode 31 form the anode-anode collector assembly 35. The anode collector layer 30 is about 0.60" tall and extends from the outside of the bottom seal 2A to form the negative contact 6, which is located along side 201B to the electrode gap near the center of the cell. It is also contemplated that the anode collector layer 30 could also extend under either or both of the side seals 2B, 2D to provide a slightly wider layer that could further reduce electrical resistance. Adjacent to cathode-collector assembly 25, with a gap 10 of approximately 0.060" therebetween, the anode-anode collector assembly 35 is printed on the substrate 201. In this cell 2000, the cathode is about 0.70" tall, while the cathode-collector assembly is approximately 1.0" tall and extends to the top of the cell to form positive contact 4. The anode for this cell is approximately 1.00" wide, approximately 0.30" tall and about 0.050" away from seals 2A, 2B, and 2D. In this particular example, the reason for this 30:70 ratio for the anode/cathode height is to allow for a cell balance to have about two to three times more anode than cathode in terms of mAHrs. However, it is understood that the anode-to-cathode ratio could be different, depending on many factors including cell size, shape, and printing method and may be adjusted to achieve a desired performance profile for the completed cell. For example, and not by limitation, other possible anode-to-cathode ratios could include 20:80, 25:75, 35:65, 40:60, 60:40, 65:35, 70:30 etc.

Because Applicant has discovered that relatively higher currents and higher discharge efficiencies of the batteries may be achieved by minimizing the number of squares in a cell, preferably the cathode collector layer 20 of the battery includes a geometry having a height and a width such that the number of squares is approximately 5 or less. More preferably, the cathode collector layer includes a geometry having a height and a width such that the number of squares is approximately 5 or less, or more preferably 3 or less, or even more preferably 1 or less. In one example, as shown in FIG. 5, the number of squares is determined by dividing the cathode collector layer height (CCH), extending in a direction between the pair of opposed side portions (e.g., between sides 201A and 201B), by the cathode collector layer width (CCW) extending in a direction along one of the pair of opposed side portions (e.g., side 201A) of the first substrate 201. In this shown example having a rectangular geometry, the height and width (CCH and CCW) of the cathode collector layer are measured along substantially perpendicular axes. Thus, it can be seen that the conductive distance CCH that current has to travel along the cathode collector layer 20 to the respective positive electrode contact 4 has been substantially reduced as compared to the conductive distance of cells 1000 and 1100. Similarly, it is preferable that the anode collector layer 30 includes a geometry having a height and a width such that the number of squares is approximately 5 or less, more preferably 3 or less, and even more preferably 1 or less. The number of squares is determined by dividing the anode collector layer height (ACH), extending in a direction between the pair of opposed side portions (e.g., between sides 201A and 201B), by the anode collector layer width (ACW) extending in a direction along one of the pair of opposed side portions (e.g., side 201A) of the first substrate 201. As before, the ACH and ACW are measured along substantially perpendicular axes, and as above the conductive distance ACH that current has to travel along the anode collector layer 30 to the respective negative electrode contact 6 has also been substantially reduced as compared to cells 1000 and 1100. As can be seen in FIG. 5, this construction gives the battery a short-and-wide configuration. By essentially decreasing the conductive height, lower cell internal resistance results so that the currents can be higher because the resistance of the cathode and anode collector layers are relatively lower.

In this example, the capacity of the cathode has an input of about 5.5 mAHrs and the anode has an input about 15 mAHrs (i.e., these are theoretical capacities). The resistance of these two electrodes collector assemblies in this cell size can be calculated in the similar manner, as was done earlier for cells 1100 and 1000. The cathode electrode-collector assembly is approximately 1.00" wide (CCW) and approximately 1.00" high (CCH) (including area under the seal 2C), providing about 1.00 Squares (1.0/1.0=1.0). The resistivity of the carbon ink for the cathode collector is approximately 33 ohms/square per 0.001" of thickness (as measured by Applicant). This means the calculated resistance of the cathode collector layer is approximately 33 ohms (33 ohms/square×1.0 squares), which is only about 34% as was in cell 1100 (which was calculated to be 96 ohms, see above). For the anode, the anode electrode-collector assembly is approximately 1.00" wide (ACW) and approximately 0.60" high (ACH) (including area under the seal 2A), providing about 0.60 Squares (0.60/1.0=0.60). The carbon-zinc ink resistivity is approximately 225 ohms/square at 1 mil thickness; therefore, the calculated anode resistance is approximately 22.5 ohms (0.60 squares×approximately 225 ohms/square @ 1 mil thick/6 mils thick). This represents only 6% of the value for cell 1100 of FIG. 2. Again, the anode was approximately 6 mils thick, which is reflected in the above calculation by reducing the resistance by a factor of 6.

In an effort to further increase capacity, FIG. 6 shows another cell/battery construction 3000. Similar reference numbers are used from FIG. 5 for similar items. This battery is made by connecting two cells (e.g., two of cells 2000 of FIG. 5) in parallel which are separated by the center seal 2E forming a battery with approximately 11 mAHrs of input capacity. For example, a first electrochemical cell 40 is provided on the first substrate 201, including a first cathode collector layer, a first cathode on the first cathode collector layer, and a first anode. The first cathode collector layer is provided on the first substrate between the pair of opposed side portions 201A, 201B. Additionally, a second electrochemical cell 42 is also provided on the first substrate, including a second cathode collector layer, a second cathode on the second cathode collector layer, and a second anode. The second cathode collector layer is provided on the first substrate between the pair of opposed side portions 201A, 201B. Both of the first and second cathode collector layers can be disposed along the same one of the pair of opposed side portions (e.g., 201A) of the first substrate 201, and both of the first and second anodes can be disposed along the same other of the pair of opposed side portions (e.g., 201B) of the first substrate 201. Additionally, either or both of the first and second electrochemical cells 40, 42 can include an anode collector layer between the first/second anode layer and the first substrate. Preferably, the first and second electrochemical cells 40, 42 are co-planar. More preferably, the first cathode and anode layers are disposed in a co-planar arrangement, and the second cathode and anode layers are disposed in a co-planar arrangement.

First and second liquid electrolytes are provided, respectively, in contact with the first and second electrochemical cells. The battery is completed with the second substrate layer being connected to the first substrate layer to form first and second inner spaces, respectively, containing each of said first and second liquid electrolytes. The first and second inner spaces are independently sealed. The electrode resistances remains the same as in cell 2000 and the active area and input is doubled to approximately 1.75 sq. inches and approximately 11 mAHrs, respectively.

Additionally, a first electrical bridge electrically couples the first electrochemical cell to the second electrochemical cell in a parallel arrangement. In one example, a printed or laminated jumper bar 51 can be provided to electrically connect the two cathode collector layers 20 to provide the parallel construction and positive contact 4. Additionally, a second electrical bridge 52 electrically couples the first and second anode collector layers together. Similar constructions using a printed or laminated jumper bar 52 could be used for the anode collector layers 30 to provide the parallel construction and negative contact 6. Thus, the first electrode contact 4 can be provided on the first electrical bridge 51, and the second electrode contact 6 can be provided on the second electrical bridge 52.

In order to increase the capacity as well as the discharge efficiencies on high drains of these cells with short and wide electrodes, multiple cells could be placed in a parallel connection, thus two, three, and four which have an input of approximately 11 to 22 mAHrs. For example, three or more cells (e.g., three or more of cells 2000 of FIG. 5) could be connected in parallel to provide additional capacity. In one example, four of the cells shown in FIG. 5 could be connected in parallel thus forming a battery that has double the area and input capacity to approximately 3.5 sq. inches and approximately 22 mAHrs, respectively. It is further understood that more than four cells could be connected in parallel to provide even greater capacities.

Also the capacities of these multi cell batteries could also be achieved by making the unit cell larger or possibly only two cells are in parallel. Alternatively, instead of a multi-cell battery, a larger single-cell battery could be formed by making the cathode collector layers 20 printed together as one wide strip along the top of the battery, with an appropriately sized cathode layer on top. Similar increased sizing could be provided to a corresponding anode collector layer and anode. Still, various geometries are contemplated that maintain a reduced number of squares for the cathode and anode assemblies. For example, the cathode and anode assemblies could be enlarged along multiple axes, so as to provide a geometry that more approaches a square shape instead of a single long, wide rectangle. Also, this new design concept is not limited to only coplanar designed cells with a ZnCl2 thin printed construction, but this concept could also be used with co-facial designs in various geometries, such as flat, cylindrical and prismatic shapes as well as any electrochemical system.

Even so, it is understood that a single cell with approximately 11 mAHrs, or 22 mAHrs of input, or any desired input, could be designed and made using the short and wide electrode design approach. For example, a single cell similar to that shown by cell 2000 of FIG. 5 could be made approximately two times larger to provide two times the active area for the electrochemical layers to achieve a two-fold increase in battery capacity, or even four times larger to provide four times the active area for the electrochemical layers to achieve a four-fold increase in battery capacity, or other increase. In one example construction a battery could provide an electrode area of about 1.75 square inches and 11 mAHrs, or the same as battery 3000 as shown in FIG. 6. This could be achieved variously, but in one example, a cell of similar dimensions as cell 3000 could be constructed without the center seal 2E and could include a single, elongated cathode collector layer and also a single elongated anode collector layer that extends the full width of the battery. Similarly, a unit cell with a capacity of 22 mAHrs capacity (e.g., four times the cell 2000) could be provided by a battery with an electrode area of about 3.5 square inches by further increasing the dimensions of the cathode and anode current collector layers along multiple axes. Of course, the increase in battery size could be achieved by adjusting various battery dimensions using various geometries. By making larger unit cells instead of connecting smaller unit cells in parallel, it is conceivable to produce a more efficient package resulting higher input capacity for the same package size.

To verify this construction concept cells/batteries shown in FIGS. 5-6 and as described in the previous paragraphs were tested, and the results are summarized in FIGS. 7 and 8 and discussed in the following paragraphs. The graphs further demonstrate the performance advantages of thin flexible batteries constructed using the new short-and-wide design. For clarity, although an example construction of the four-cell parallel variant is not shown in the drawings, it will be referred to by reference number 4000 for use in the experimental results charts of FIGS. 7-8. It is to be understood that these graphs illustrate only example performances of the new short-and-wide design, and that the new design cells can have various other performance characteristics, values, etc. The experimental data was tabulated from experiments done at room temperature. FIG. 8 also shows efficiencies for the compared cells.

Figure 7:
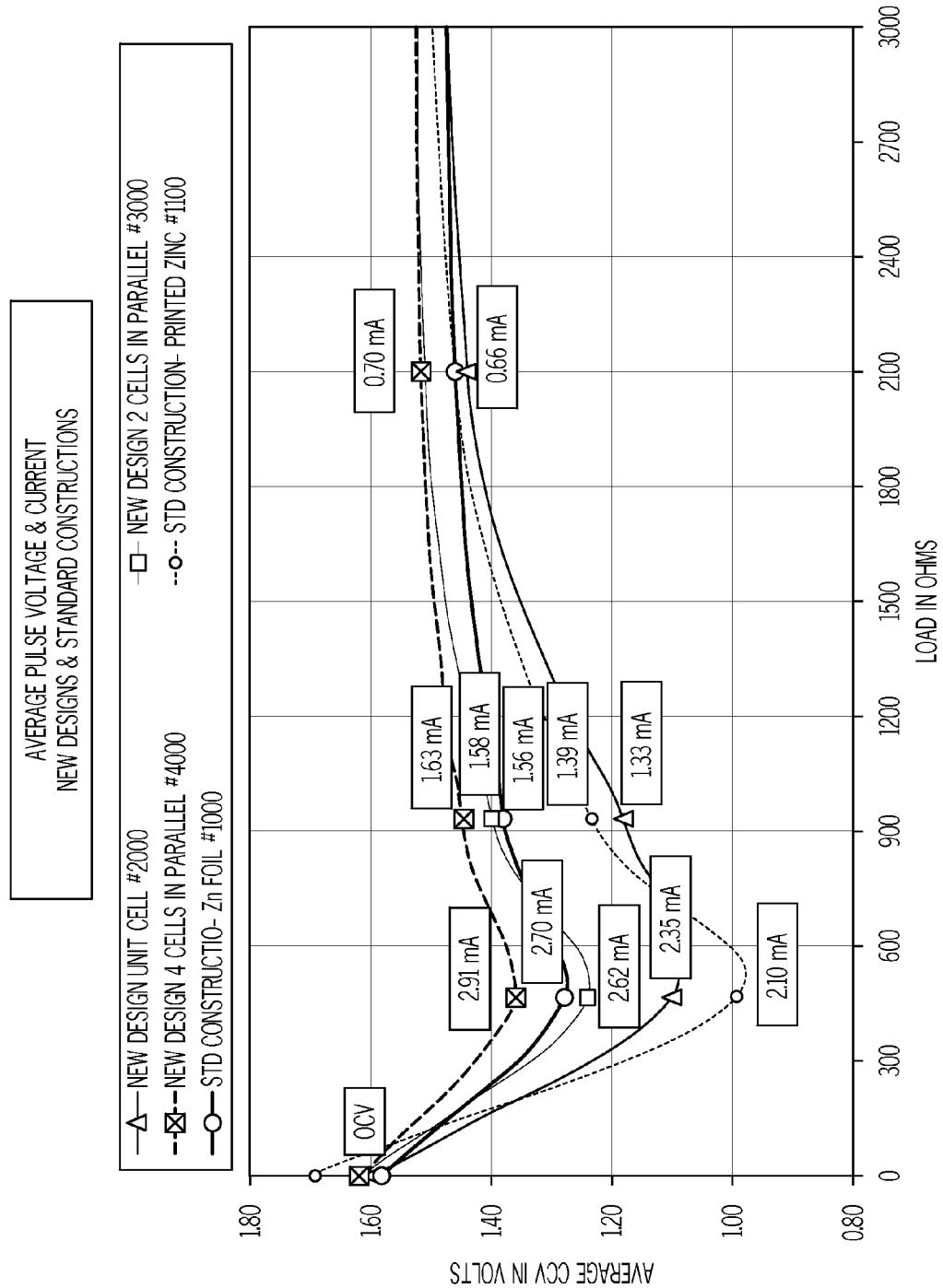
FIG. 7 shows a chart illustrating experimental results using the battery of FIGS. 1-2 and 4-5 in a third experimental regime.
Figure 8:
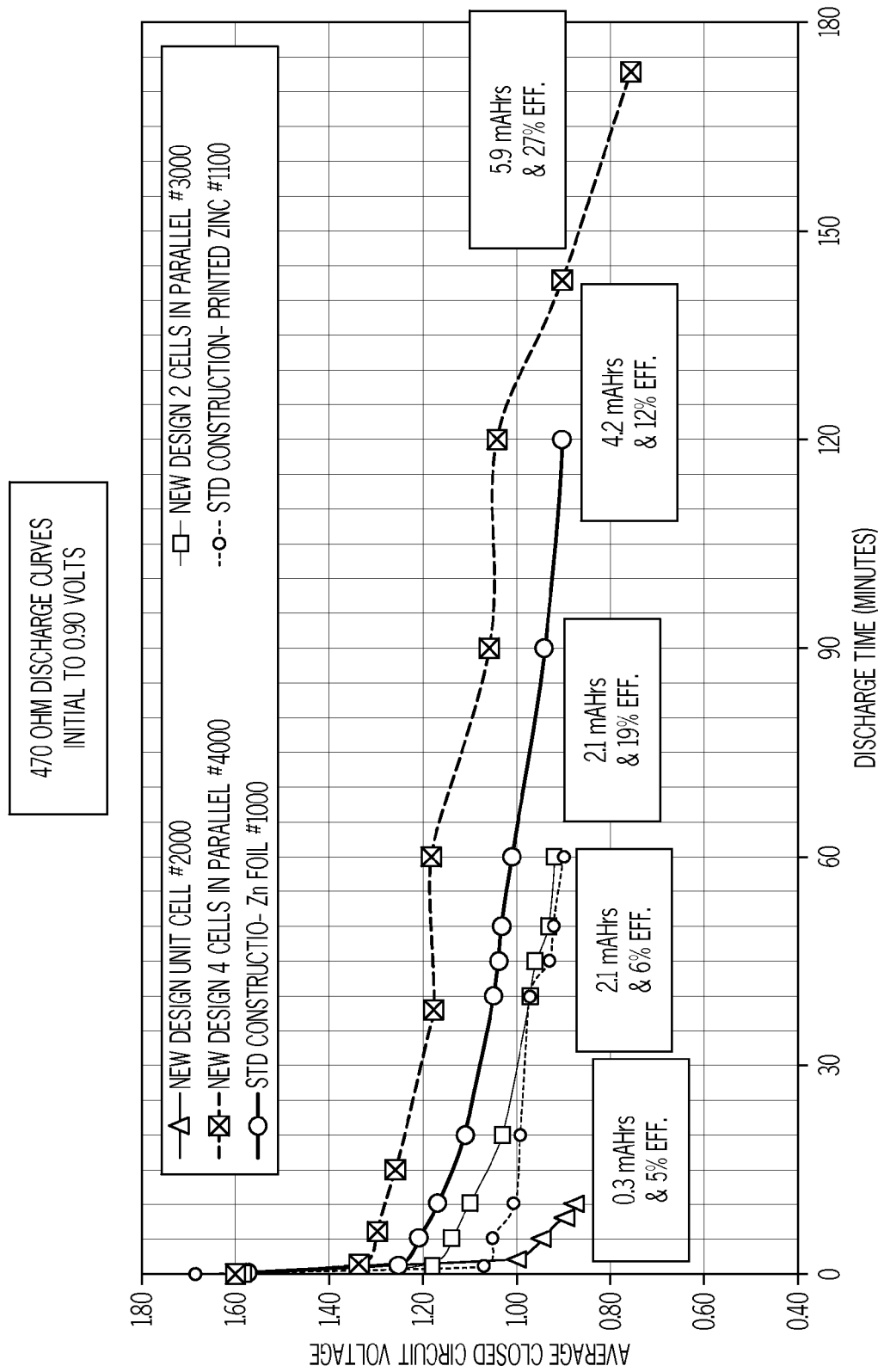
FIG. 8 shows a chart illustrating experimental results using the battery of FIGS. 1-2 and 4-5 in a fourth experimental regime.

FIG. 7 shows five different curves representing the cells the cell constructions discussed in the previous paragraphs. For ease of discussion the cell number discussed in the above paragraphs will also be used in these discussions. FIG. 7 shows five different curves each one representing one of the cell constructions discussed earlier. These curves represent the average cell closed circuit volts (CCV) under three different two second long pulses, and the cell current is shown at each data point. Since high current and high discharge efficiencies were the goal of the construction changes, these features will be emphasized in the discussions. These cells of 1000, 1100, 2000, 3000 (e.g., two 2000 cells in parallel), and 4000 (e.g., four 2000 cells in parallel) have active areas of 2.66, 2.66, 0.85, 1.75, and 3.5 sq. inches respectively as well as inputs of about 35, 35, 5.5, 11.0 and 22 mAHrs, respectively.

The new design cells 2000, 3000, and 4000 are compared electrically with the previous standard designed cells shown in FIG. 1 (1000) and FIG. 2 (1100). This data shown in FIGS. 7 and 8 confirms the projected improved cell performance. FIG. 7 shows the two cell constructions performance in terms of two-second pulse current drain with a range of three different pulse loads. This data clearly shows that the original construction 1100 featuring tall and narrow electrodes with a printed zinc anode has much lower pulse voltages as well much lower currents. The original construction 1000 with zinc foil has much better results than its printed zinc version of FIG. 2 cell 1100, but only similar to the smaller new design cell 3000 that has only approximately 11 mAHrs. The 22 mAHrs cell 4000 at all of the drain rates ranging from 0.7 mA to ~2.9 mA has superior performance, than the much larger cells 1000 with zinc foil and cell 1100 with printed zinc that have 35 mAHrs of capacity.

When these two different cell designs are discharged continuously with a 470 ohm load, as shown in FIG. 8, the results show that the smaller 22 mAHr cells of the new design clearly outperform the much larger original designed cells with printed zinc as well the cell with zinc foil (1000). Using a cutoff voltage of 0.90 volts, the 22 mAHr cell with the new design of short and wide electrodes produced approximately 5.9 mAHrs of power with a discharge efficiency of 27% (i.e., cell output/cathode input). The zinc foil cell (1000), made with the old design and 35 mAHrs of input, delivered approximately 4.2 mAHrs of capacity and had a discharge efficiency of only approximately 12%. Comparatively, this is only 44% as efficient as the new design (4000). Then comparing the old cell design 1100 with a printed anode and still with approximately 35 mAhrs of capacity, they delivered only approximately 2.1 mAHrs which is approximately 6% efficient and is about only 22% efficient as cell 4000 with the new design. The performance of the original design cell 1000 with a 35 mAHrs of input is less efficient than the new design cell/battery 3000 with only approximately 11 mAHrs of input capacity. This new design cell 3000 gave the same output of approximately 2.1 mAHrs but at an efficiency of approximately 19%, which is three times higher than the larger old cell design 1100 with printed zinc.

In order to construct the new cell designs 2000, 3000, 4000, the following constructions and methods of manufacture can be utilized. In one example, the electrochemical cells (i.e., batteries) are typically printed and/or laminated on a continuous, flexible substrate web, and may be formed into a roll or the like. The individual batteries can be removed from the roll, such as one at a time. For example, the batteries can be cut from the roll, and/or perforations of the flexible substrate roll can be provided for easy tear off. In addition, the batteries can further be manufactured in an integrated process with one or more electrical components, such as an antenna, display, and/or a processor, for example. The multiple facets of this application could be used in the total package described and/or they could be used individually or in any combination.

In one example construction, referring to the batteries of FIG. 5-6, the cells are printed and assembled on a bottom, first substrate 201 that includes a pair of opposed side portions 201A, 201B. To provide greater clarity, the batteries are shown without the top, second substrate. The bottom and/or top substrates can be a material that includes a plurality of laminated layers. The plurality of laminated layers can include a structural layer having an integrated barrier and/or a heat sealing layer, such as any described herein. The plurality of laminated layers can include any or all of an inner layer including a polymer film and/or a heat sealing coating, a high-moisture barrier layer, a first adhesive layer for connecting said inner layer to said high-moisture barrier layer, an outer structural layer including an orientated polyester, and/or a second adhesive layer for connecting said high-moisture layer to said outer structural layer. The high-moisture barrier layer can include an oxide coated moisture barrier layer that non-hermetically seals the battery against moisture, and may or may not include a metal foil layer. The plurality of laminated layers could optionally include a metalized layer.

A current collector layer can be provided separately underneath each of the cathode and anode of the electrochemical cell. Each current collector layer can be provided via a dried or cured ink (e.g., printed), or can be provided via a non-printed process, such as laminates, adhesives, strips of material, etc. Indeed, all of the current collectors, anodes, and cathodes can be provided as cured or dried inks. Generally, the current collector layer is provided as a different material from the anodes and cathodes. The anode and cathode of each cell can be printed, respectively, on each of the cathode collector and/or anode collectors. It is contemplated that any or all of the current collectors can be provided directly upon the lower first substrate, in the same printing station, although any or all of the current collectors could be provided on top of optional intermediate layers. Preferably, the cathode collector layer and the anode collector layer are disposed in a co-planar arrangement.

The cathode collector layer 20 can be provided on the first substrate 201 between the pair of opposed side portions 201A, 201B and can be formed of a dried or cured ink. Similarly, an anode collector layer 30 can also be provided on the first substrate 201 between the pair of opposed side portions 201A, 201B and can be formed of a dried or cured ink. The anode collector layer 30 is provided between the anode layer and the first substrate. In one embodiment, the cathode collector layer 20 and the anode collector layer 30 are printed, preferably in the same operation, with the same carbon ink. In this operation, a gap 10 of about 0.060" is maintained between the cathode and anode collectors. In various examples, the flexible battery can be manufactured (i.e., printed) directly or indirectly on the bottom, first substrate 201, or can even be separately manufactured (wholly or partially) and then attached directly or indirectly to the bottom, first substrate 201. Next, a sealant can be printed over the collectors in the seal areas. The sealant could also be printed on the cell perimeters to form a picture frame pattern.

The anode 31 is then printed over the anode collector layer 30 that is inside of the seal area, and the cathode 21 is also printed over the cathode collector layer 20 that is inside of the seal area. This printing also maintains the gap of about 0.060" between the cathode and anode. The anode 31 and cathode 21 of each unit cell can be printed in a co-planar arrangement. The anodes and cathodes can be comprised of cured or dried inks. In at least one embodiment, on the large area part of the cathode collector layer 20, the cathode layer 21 is printed using an ink comprising manganese dioxide, a conductor such as carbon (e.g., graphite) for example, a binder, and water or other solvent. In various other examples, the cathodes can be printed using an ink that includes one or more of manganese dioxide, carbon, NiOOH, silver oxides $Ag_2O$ and/or AgO, HgO, oxygen $O_2$ in the form of an air cell, and Vanadium oxide $VO_2$. The anode layer 31 can be printed as conductive zinc ink. In various other examples, the anodes can be printed using an ink that includes one or more of zinc, nickel, cadmium, metal hydrides of the AB2 and the AB3 types, iron, and $FeS_2$.

After all of the printing is completed, then the cell is assembled. For example, after the electrode layers (anode layer and cathode layer) are in place, seals 2A, 2B, 2C, and 2D can be placed around the electrodes. In one example, an optional "picture frame" can be placed around the electrodes as a spacer. One method is to print this cell picture frame with a dielectric ink, for example, such as a cured or dried adhesive ink. Another method is to utilize a polymer sheet, stamped, die cut, laser cut or similar methods to form the appropriate "pockets" (inner space or spaces) to house materials as well as cutouts for the cells contacts. In the simplified construction being discussed here, the picture frame could comprise a die cut polymer laminate sheet, such as a polyester or polyvinyl chloride (PVC), etc., in the middle and having two outside layers of pressure sensitive adhesive with release liners (e.g., top surface and bottom surface). Generally, when stamped frames are used, each "picture frame" has a total thickness (excluding the thickness of the liners) of about 0.010" (about 0.003"-0.50"). The "picture frame" can be placed on the bottom laminate structure after removing a bottom release liner so that the anode and cathode are centered within the frame. Alternatively, the picture frame could be replaced by a printed or laminated adhesive provided in the shape of the above-described frame. When a printed frame is used, they are generally much thinner with a thickness of about 0.002" (e.g., about 0.0005"-0.005"). In some cases, to ensure a leak-free construction, a sealing and/or caulking adhesive, a heat sensitive sealant, and/or double sided PSA tape can be placed and/or printed on top of the anode collector layer and on top of cathode collector in an area that falls under the picture frame. The sealing adhesive can also be provided underneath the remainder of the picture frame. The top PSA layer adheres and seals the top laminate substrate to the picture frame and bottom PSA layer can be used to adhere and seal the bottom laminate substrate to the picture frame.

If an optional picture frame is used, it can be placed over the printed area and exposes the anode and cathode, as well as the electrode contacts 4 and 6. The picture frame spacer thickness controls the cell thickness. For example, this frame can be a three layer laminate (excluding the two adhesive release liners) consisting of two layers PSA of about 0.003"

thick on the outside and a PET layer in the center with a thickness of 0.003" to about 0.015" depending on the cell thickness. The picture frame could feature a cutout to expose the anode and cathode, and also form a cavity for the electrolyte. Also there can be cutouts on the opposite sides to expose the negative and positive electrode contacts to the battery.

The anodes and cathodes of the electrochemical cell interact through the electrolyte 17 to create an electrical current. The electrolyte can include one or more of: zinc chloride, ammonium chloride, zinc acetate, zinc bromide, zinc Iodide, zinc tartrate, zinc per-chlorate, potassium hydroxide, and sodium hydroxide. The liquid electrolyte layer can comprise a polymeric thickener comprising one or more of polyvinyl alcohol, a starch, a modified starch, ethyl and hydroxyl-ethyl celluloses, methyl celluloses, polyethylene oxides, and polyacryamides. Additionally, the electrolyte layer can further comprise an absorbent paper separator 8. As described herein, the electrolyte is a viscous or gelled electrolyte. If the electrolyte is not part of the gelled coating, a cell electrolyte is provided to an absorbent material such as a "paper separator" 8 that covers or partially covers both electrodes. The electrolyte can be an aqueous solution of $ZnCl2$ at weight percent of about 27% (about 23%-43%) that could also contain a thickener, such as carboxymethylcellulose (CMC) or other similar materials at about 0.6% level (about 0.1%-2%). Any of the electrolytes can include an additive to prevent or reduce gassing in the electrochemical cell (e.g., prevent or reduce the generation of hydrogen gas in the cells). The separator 8 is placed in the spacer cavity over the anode and cathode. The liquid electrolyte 17 is then added to the separator 8, such as a 27% aqueous solution of $ZnCl2$ (or other electrolyte solution). After the electrolyte is added and soaked into the separator, a top substrate (e.g., the second substrate) is added and heat sealed with the PSA layer on the top and bottom of the spacer in a picture frame pattern to the spacer.

The cell is completed by applying and sealing the top, second substrate 202 (partially shown) to the first, bottom substrate 201 to form an inner space containing the electrolyte, and also containing at least a major portion of the cathode layer and the anode layer within the inner space. The first substrate 201 can be sealed to the second substrate 202 using the PSA and/or with a heat seal. The top, second substrate 202 is connected to the bottom, first substrate 201 to contain the liquid electrolyte 17 such that the electrochemical cell is sealed. If present, the top, second substrate 202 can be sealed over the optional picture frame. Prior to applying the top, second substrate 202, a release liner, if present (not shown), is removed from an adhesive layer on top of the optional picture frame. In another example, a printed adhesive can be used to connect the top and bottom substrates. Additionally, the printed adhesive may extend over and cover at least a portion of the anode and/or cathode layers. In another example, the top and bottom substrates can be directly connected to each other without an intermediate adhesive or picture frame. It is also contemplated that where a picture frame is not utilized, the top laminate substrate is connected to the bottom laminate substrate to form the inner space containing the liquid electrolyte.

When the top, second substrate is sealed over the bottom, first substrate 201, an outer seal area is formed. The seal area inhibits, such as prevents, the liquid electrode from leaking out of each cell. The width of the seal area can vary based on the overall size and geometry of the battery (and normally the smaller the cell/battery the narrower the seal width). In one example, the seal area can have a minimum width of about 0.075 inches. The maximum width can vary based on the various batteries, with a typical width of about 0.250" and can be as large as 0.300 inches, or even greater. This battery construction with the same geometries can also be made without the frame in high volumes with a commercial pouch filling machine. It is contemplated that the seal area may be substantially the same around the perimeter of each cell, or may differ along the perimeter of each cell as desired.

In order to electrically connect the battery to external electronics, electrode contacts are provided. For example, a first electrode 4 contact is electrically coupled to the cathode collector layer 20 and is disposed along one of the pair of opposed side portions (e.g., side 201A) of the first substrate 201, and a second electrode contact 6 that is electrically coupled to the anode layer 31 and is disposed along the other of the pair of opposed side portions (e.g., side 201B) of the first substrate 201. The second electrode contact 6 can be directly electrically coupled to the anode layer 31, or indirectly electrically coupled via the anode collector layer (i.e., if the second electrode contact 6 is electrically coupled to the anode collector layer). The positive and negative contacts 4, 6 are exposed outside of the electrochemical cell for connection to other electronics. Either or both of the positive and negative contacts 4, 6 may have a printed or laminated conductive layer thereon, such as a printed silver ink or the like, or may include other layer(s) that facilitate coupling or electrical conductivity to the electronics. It is further contemplated that at least one of the first and second substrates can include a cutout area extending therethrough such that one of the first and second electrode contacts is exposed through the cutout area. For example, the top, second substrate could include a pair of cutouts, with one cutout each located over the desired location of the positive and negative contacts 4, 6.

The cell could also be assembled by hand or in an automatic process with a pouch assembly machine without a spacer. For example, this can be done by having a roll of printed cells that is fed through the pouch machine and in the first station, the separator is cut or blanked out and placed over the anode and cathode. The next station could pump in the required amount of electrolyte. A roll of substrate, which is the same or could be different than the bottom substrate laminate, is matted to the bottom web. After the two substrates are matted together, the electrolyte station could be activated. In this situation, the electrolyte is pumped through very small diameter tubes that are inserted between the two layers of substrates before they are sealed together. Next, after the electrolyte is added, the electrolyte tubes are removed and the cell can be heat sealed in a picture frame pattern. The assembled cells are then blanked or cut out of the web.

Additional constructions and methods of manufacture will be further discussed. As used herein, unless otherwise explicitly indicated, all percentages are percentages by weight. Also, as used herein, when a range such as "5-25" (or "about 5-25") is given, this means, for at least one embodiment, at least about 5 and, separately and independently, not more than about 25, and unless otherwise indicated, ranges are not to be strictly construed, but are given as acceptable examples. Also herein, a parenthetical range following a listed or preferred value indicates a broader range for that value according to additional embodiments of the application.

The present application relates to thin, printed electrochemical cells and/or batteries comprising a plurality of such cells. Such cells each typically include at least a first electrode including a first electrochemical layer (e.g., a cathode), a second electrode including a second electrochemical layer (e.g., an anode), and an electrolyte that interacts with the electrodes to create an electrical current. All of the first and second electrodes and the electrolyte are typically contained within some structure that provides an external electrical access to the electrodes for providing an electrical current supply to some device.

One method of mass-producing such cells includes depositing aqueous and/or non-aqueous solvent inks and/or other coatings in a pattern on a special substrate, such as a laminated polymeric film layer, for example. The depositing can be by means of, for example, printing electrochemical inks and/or laminating a metallic foil, such as zinc foil, for example, on one or more high-speed web rotary screen printing presses, especially if the desired volumes are very high. If volumes are relatively lower, say in the quantities of only about several million or less, then relatively slower methods such as web printing with flat bed screens could be appropriate. If the volumes are even lower, such as hundreds or thousands, then a sheet-fed flat bed printing press may be utilized, for example. Still, various printing methods can be used for various desired quantities.

After the inks are printed and/or the solids have been properly placed, the cells can be completed (e.g., electrolyte added, sealed, die cut, stacked and/or perforated and wound into a roll, or stacked if sheets are used on a printing press). This cell manufacturing process can also be utilized for integrating one or more individual cells with an actual electronic application, or into batteries comprising multiple cells connected in series or parallel, or some combination of the two. Examples of such devices and corresponding processes will be described later, but many additional embodiments are also contemplated.

As discussed above, the battery may be described as a printed, flexible, and thin. Such a cell/battery can include, for example, a lower film substrate that can utilize a special polymer laminate that has special features, possibly including, for example, a high moisture barrier layer in the center that is surrounded by polymer films on both sides. Furthermore, one or both outside surfaces can be made to be print receptive for printing information, logos, instructions, identifications, serial numbers, graphics, or other information or images, as desired.

Depending on which construction of this battery is used, one ply of a multi-ply substrate could also feature a heat-sealing layer that might be co-extruded adjacent the barrier coating. In addition, a portion one substrate layer of a cell of at least some embodiments could utilize a cathode current collector and/or an anode current collector, such as carbon, for example, printed or coated or otherwise applied on a portion of the film substrate. At an outside contact area of this collector can also be printed a layer of a relatively highly conductive ink, such as carbon, gold, silver, nickel, zinc, or tin, for example, to improve the conductivity to the application connection, if desired.

The first and/or second substrates can include various layers, such as five layers. For example, the various layers of first substrate can include three plies of film, and two layers of a UV cured urethane laminating adhesive that can be relatively thin, such as about 0.2 mils thick, with a range of about 0.1-0.5 mils. In one example, this laminated structure can be supplied by Curwood Inc., a Bemis Corporation Company of Oshkosh, Wis. The top film layer can be a heat sealable layer, such as provided by DuPont (OL series), which is on the inside of the cell and can have an example thickness of about 0.00048" thick (e.g., about 0.0002"-0.002"). The middle film layer can be a high moisture barrier polymer layer such as the GL films supplied by Toppan of Japan. Typically, this polyester film can have an oxide or metalized coating on the inside of the laminated structure. This coating could have varying moisture transmission values depending on the type and the amount of vacuum deposited oxides, or metals. The third film layer, which can be on the outside of the completed cell, can be a polyester layer that can act as a structural layer. This structural layer of the five ply layer structure can be orientated polyester (OPET) and have a thickness of about 0.002" (e.g., about 0.0005"-0.010"), which can also be laminated to the other layers by means of a urethane adhesive that is about 0.2 mil thick, for example. This "structural layer" can be a DuPont polyester orientated (OPET) film such as their Melinex brand, for example. Another material that can be used is from Toyobo Co. Ltd. of Japan, which is polyester based synthetic paper, which is designated as white micro-voided orientated polyester (WMVOPET). In some cases, for example where the cell by design has a higher gassing rate and a short life cycle, it may be appropriate and desirable to use a film with a higher transmission rate to allow for a larger amount of gas to escape, so as to minimize cell bulging. Another example would be an application that is in a hot dry environment such as a desert or some special industrial application. In such cases, it may be desirable to have a barrier film with low transmission rates to prevent excessive moisture loss from the batteries.

The use of a thicker substrate, by increasing any or all of the polymer thicknesses, may have some advantages: These may include one or both of the following: The cells process better on printing press due to the thicker substrate being less temperature sensitive; and The cell package is stiffer and stronger.

In addition to the above specifications, both the outside and the inside layers could include the addition of a print-receptive surface for the inks, metalized films and/or a very thin metal foil or foils as a moisture barrier. These may include one or more of the following: Laminated structures with metal barriers (thin metal foil or a vacuum metalized layer) are likely more expensive; Laminated structures with metal layers have the possibility of causing internal shorts; and Laminated structures that include a metal barrier could interfere with the electronics of an application, such as the functionality of a RFID antenna, for example.

The various substrates described herein can be comprised of numerous variations of polymeric film, with or without a barrier layer (including metal or other materials), and can utilize either mono-layer or multi-layer films, such as polyesters or polyolefin. Polyester is a good material to utilize because it provides improved strength at the high temperature drying conditions, thus permitting use of a thinner gauge film and is typically not easily stretched when used on a multi-station printing press. If a very long shelf life is desired, and/or the environmental conditions are extreme, the multi-ply laminates could be modified to include a metalized layer such as obtained by vacuum deposition of aluminum in place of the oxide coating.

Alternately, a very thin aluminum foil could be laminated within the structure of the film layer, or even in a different position that would be of a lower cost and still allow the cell to function for the desired lifetime.

In applications where only an extremely short life is desired, the cell package could instead use a film layer of a low cost polymer substrate such as polyester or polyolefin. It is possible that the pressure sensitive adhesives for coupling and/or sealing the various substrates together could be replaced with a heat sealing system on the laminates. For example, a heat sealing coating or the like could be used, with one such example material being the Ovenable Lidding (OL) films made by Dupont and designated as their OL series such as OL, OL2 or OL13.

For at least some embodiments, a water-based ink electrochemical layer is printed as the cathode. Such a cathode layer can include, for example, manganese dioxide (MnO2), carbon (e.g., graphite), a polymer binder, and water. Other formulations for the cathode layer can also be utilized with or without any of these materials. If a cathode collector layer is used, the cathode electrochemical layer will be printed on at least a portion of the cathode current collector, which is printed or otherwise applied first to the substrate. Still, the cathode current collector may or may not form a portion of the cathode layer.

Regarding the anode, the anode layer could be applied by printing a zinc ink onto the substrate or on top of a collector, such as carbon. Where carbon is used, it could be printed in the same station as the carbon collector used for the cathode and electrical bridge. Alternatively, in an off-line operation, a dry-film adhesive layer, possibly using a release liner, can be applied to the zinc foil. The zinc foil can then be laminated to the base substrate.

Optionally, printed over one or both the anode and cathode, is a starch ink or similar material. The starch ink can act as an electrolyte absorber to keep the electrodes "wet" after an aqueous electrolyte solution is added to the cell. This starch ink could also include the electrolyte salts and the water used for the cell reaction. A paper layer over the anode and cathode could be used in place of the printed starch. In at least one embodiment, the construction of the printed starch layer with the addition of the aqueous electrolyte could be replaced, for example, by a printable viscous liquid (which could include a gel, or some other viscous material) that effectively covers at least a portion, such as substantially all, of each electrode. One such printable gel is described in United States Patent Publication 2003/0165744A1, published on Sep. 4, 2003, and incorporated herein by reference. These viscous formulations could, for example, utilize the electrolyte formulas and concentrations as discussed herein.

Optionally, for some embodiments, after the two electrodes are in place, with or without the starch layer(s), an optional cell "picture frame" can be added. This could be done using a number of different methods. One method is to print this optional cell picture frame with a dielectric ink and/or adhesive, for example. Another method is to utilize a pressure sensitive adhesive or even an optional polymer sheet or a laminated polymer sheet that includes adhesive layers, that is stamped, die cut, laser cut or similar methods to form the appropriate "pockets" (inner space or spaces) to house materials of each unit cell as well as to expose the electrical contacts to connect the device. It is contemplated that the flexible battery can be formed with or without the frame. For example, while the frame can offer one method for providing inner space for the electrochemical cells, it is also contemplated that the first and second substrates could be secured together to provide the inner space for the electrochemical cells without the use of a frame.

To ensure good sealing of the picture frame to the substrates, and to provide good sealing of the contact feed-through (providing an electrical pathway from the cell inside to the cell exterior), a sealing or caulking adhesive could be printed over the contact feed-through and the substrate, such as in the same pattern as the cell frame, for example, prior to the frame being printed or prior to the polymer sheets being inserted, for example. This sealing or caulking material could be pressure sensitive, and/or heat sensitive, or any other type of material that would facilitate sealing to both surfaces.

After the dielectric picture frame is printed and dried and/or cured, a heat sensitive sealing adhesive can be printed on top of the frame to allow good sealing of the top substrate to the cell frame. This cell picture frame could also comprise a polymer film or a laminated film of about 0.015" thick (range of about 0.003"-0.050") that is pre-punched and then laminated in registration to match the preprinted caulking adhesive layer described above.

Zinc chloride (ZnCl2) can be chosen as the electrolyte, for at least some embodiments, in the concentration range of about 18%-45% by weight, for example. In one example, about 27% may be preferred. The electrolyte can be added, for example, to the open cell. To facilitate processing on the line, this electrolyte, or a different electrolyte, could be thickened with, for example, CMC at about a level of about 0.6 wgt % (range of about 0.05%-1.0%).

Other useful electrolyte formulations, such as ammonium chloride (NH4Cl), mixtures of zinc chloride (ZnCl2) and ammonium chloride (NH4Cl), zinc acetate (Zn(C2H2O2)), zinc bromide (ZnBr2), zinc fluoride (ZnF2), zinc tartrate (ZnC4H4O6.H2O), zinc per-chlorate Zn(ClO4)2.6H2O), potassium hydroxide, sodium hydroxide, or organics, for example, could also be used.

Zinc chloride may be the electrolyte of choice, providing excellent electrical performance for ordinary environmental conditions normally encountered. Likewise, any of the above mentioned alternative electrolytes, among others, could be used in concentrations (by weight), for example, within the range of about 18%-50%, with the range of about 25%-45% used for at least some other embodiments. Such compositions could also provide acceptable performance under ordinary environmental conditions. When zinc acetate is used to achieve improved low temperature performance for low temperature applications, the zinc acetate concentration in the range of about 31-33, is often acceptable, although ranges of about 30-34, about 28-36, about 26-38, and even about 25-40, weight percent, could also be utilized.

The use of electrolytes other than of zinc chloride can provide improved cell/battery electrical performance under some differing environmental conditions. For example, about 32% by weight zinc acetate (F.P.—freezing point— about 28° C.) exhibits a lower freezing point than about 32% by weight zinc chloride (F.P. about −23° C.). Both of these solutions exhibit a lower freezing point than of about 27% zinc chloride (F.P. about −18° C.). Other zinc acetate concentrations, e.g. about 18-45 or about 25-35 weight percent, also exhibit reduced freezing points. Alternatively, an alkaline electrolyte such as Sodium hydroxide (NaOH) or potassium hydroxide (KOH) could be used as an electrolyte to provide improved cell/battery electrical performance under some differing environmental conditions. The cell performance could be greatly enhanced due to the much higher conductivity of the KOH electrolyte. For example, a good working range of KOH would be concentrations (by weight) within the range of about 23%-45%. Where an alkaline electrolyte is used, it can be beneficial to utilize a suitable and chemically compatible material for the top and/or bottom substrates of the flexible battery, such as nylon, polyolefin, or the like.

Use of such electrolyte formulations as substitutes for zinc chloride, or in various mixtures used in cells, can allow for improved performance at low temperatures. For example, it has been found that the use of an about 32% zinc acetate electrolyte substantially improves low temperature (i.e. below about −20° C.) performance of a voltaic cell. This type of electrochemical cell performance improvement at low temperature can be utilized in the growing business of battery assisted RFID tags, for example, and/or other transient (transportable) electrically operated devices, such as smart active labels and temperature tags, for example, which may be used in cold environments.

For example, many products that are shipped today, such as food products pharmaceuticals, blood, etc, may require low temperature storage and shipping conditions, or even low temperature operation. To ensure safe shipment of such goods, these items can be tracked with RFID tags, sensors, and/or displays. These tags and/or labels might require electrochemical cells and/or batteries to operate effectively at temperatures at, or even below, −20° C., such as at about −23° C., about −27° C., or even at about −30° C. or less.

The upper substrate of a cell package could utilize a special laminated polymeric film. The upper layer is sealed around the edges of the cell frame by means of a pressure sensitive adhesive (PSA), and/or with the heat sensitive sealing adhesive that was previously printed or just with the heat sealing layer of both the upper and lower substrates, thus confining the internal components within the cell frame.

The above-described constructions can be wet cell constructions; however, using a similar cell construction, the battery could be also be made into a reserve cell construction, which has the benefit of providing extended shelf life prior to the application of a liquid. The printable, flexible, zinc chloride thin cell is made environmentally friendly.

The devices for which this technology can be used are extensive. Devices that utilize relatively low power or a limited life of one to three years, and possibly longer, could function utilizing a thin cell/battery of the type described herein. The cell, as explained in the above paragraphs and below, can often be inexpensively mass-produced so that it can be used in a disposable product, for example. The low cost allows for applications that previously were not cost effective, and could now be commercially feasible.

The electrochemical cell/battery according to the application might have one or more of the following advantages: Flat, and of relatively uniform thickness, where the edges are thinner than the thickness at the center; Relatively thin; Flat, and of relatively uniform thickness, where the edges are of about the same thickness as the center; Flexible; Many geometric shapes are possible; Sealed container; Simple construction; Designed for high speed and high volume production; Low cost; Reliable performance at many temperatures; Good low temperature performance; Disposable and environmentally friendly; Both cell/battery contacts provided on opposite surfaces, or even the same surface; Both Cell/battery contacts can be provided at many locations on the battery exterior; Ease of assembly into an application; and Capable of being easily integrated in a continuous process at the same time that the electronic application is being made.

The above provides a general description of various cell constructions according to some embodiments of this application, and further details utilizing drawings follow below. Cell and battery production processes for cell manufacturing, printing and/or assembly also will be described as well.

In one example, such as where relatively high speed, high output manufacturing is contemplated, such as 50 linear feet per minute or another relatively high speed, multiple webs can be used. It is to be understood that the multiple webs can be generally continuous, and can be utilized with known web manufacturing equipment. A first web can be relatively thin, such as ~0.001"-0.010" and preferably about 0.002-0.006", flexible base substrate including a multi-ply laminated structure or single ply material. In one example, the multi-ply structure can include five layers. Alternatively, the single ply material can include various materials, such as Kapton, polyolifins or polyester. Additionally, if the 0.001" layer is too thin to handle efficiently on the printing press and/or on other operations, then a thicker throw away support layer with a low tact pressure sensitive adhesive layer could be laminated to the thin substrate layer. Also, this 0.001" substrate layer could be made from more than one ply with a very thin oxide layer which performs as a water barrier on the inside surfaces. After the printing and assembly operations are completed, then the throw away support layer could be removed.

A second web could be a relatively thicker laminated structure including a PVC or Polyester film that is about 0.003-0.030" thick, and preferably about 0.006-0.015" thick. The second web can have a layer of pressure sensitive adhesive (without the release liner) at about 1-5 mils thick on one or both sides. After this laminated structure of the second web is completed, it can be applied to the first web. In addition or alternatively, the second web can be pattern cut using any type of mechanical means to allow for cavities for the cells active materials as well as an optional cavity for the cell/battery contacts. A third web can be a relatively thin laminated structure the same and/or similar to the first web. The completed three web structure may have a pressure sensitive adhesive on either side to allow the individual device assembly to be applied as a label. The cell/battery may be of the thin cell type, such as described in co-pending U.S. application Ser. No. 11/110,202 filed on Apr. 20, 2005, Ser. No. 11/379,816 filed on Apr. 24, 2006, Ser. No. 12/809, 844 filed on Jun. 21, 2010, Ser. No. 13/075,620 filed on Mar. 30, 2011, Ser. No. 13/625,366 filed on Sep. 24, 2012, and Ser. No. 13/899,291 filed on May 21, 2013, as well as issued U.S. Pat. Nos. 8,029,927, 8,268,475, 8,441,411, 8,574,745, all of which are incorporated herein by reference.

Depending on the cell construction, the cell application, and/or the cell environment, it may be advantageous to have different barrier properties for the substrate. Due to the wide range of available vapor transmission rates available, the barrier layer can be chosen for each specific application and construction, as desired. In some cases, for example where the cell by design has a higher gassing rate and/or a short life, it may be appropriate and desirable to use a film with a higher transmission rate to allow for a larger amount of gas to escape, so as to minimize cell bulging. The barrier layer is designed to minimize water loss but still allow generated gasses of normal electrochemical reactions to escape thus reducing the chances of the thin cell to bulge. Another example would be an application that has a long shelf life or is in a hot dry environment such as a desert. In such cases, it may be desirable to have a barrier film with low transmission rates to prevent excessive moisture loss from the cell. At least one of the first and second substrate layers can comprise a plurality of laminated layers including an oxide barrier layer having a gas transmission rate that permits gas to escape through said plurality of laminated layers of said first or second substrate layer, but still reduces (e.g., minimizes) the escape of water vapor. In addition or alternatively, the oxide coated moisture barrier layer can have a moisture vapor transmission rate that permits moisture vapor to escape through said plurality of laminated layers of the covering layer to an external environment, and may not include a metal foil layer. It is understood that because the oxide barrier layer can be designed to provide a desired gas transmission rate and/or moisture vapor transmission rate, the oxide barrier layer non-hermetically seals the battery against gas and/or moisture.

Various embodiments of example constructions of the laminated film substrates can be utilized. The lower and upper laminated film layers can, in most cases and for most applications, be of the same materials. In at least one embodiment, these film layers can be comprised of a five-ply laminate film, for example. In another example, the laminated film substrates can have four layers. The top layer placed on the inside of the cell has an example thickness of about 0.48 mil thick (about 0.2-5.0 mil) and is a high moisture barrier polymer layer film that provides a flexible, heat-sealable web that has the following barrier properties: oxygen transmission rate of less than about 0.045 cubic centimeters per 100 square inches per 24 hours at about 3° C. and 70% relative humidity; and MVTR of between about 0.006-0.300 grams water per 100 square inches per 24 hours at about 4° C. and 90% relative humidity.

Typically, this polyester film has an oxide or metalized coating on the inside of the laminated structure. These polymer (polyester)-based barrier films, which can have varying moisture transmission values depending on the type and the amount of vacuum deposited oxides, or metals, and can be laminated to the bottom polyester layer and which acts as a structural layer with a Urethane adhesive. The inside layer of these substrates can include a heat sealing layer. Another alternative high moisture barrier could be a flexible, heat-sealable web that has the following barrier properties: oxygen transmission rate of less than about 0.045 cubic centimeters per 100 square inches per 24 hours at about 73 F and 50% relative humidity; and MVTR of less than about 0.30 grams water per 100 square inches per 24 hours at about 100 F and 90% relative humidity.

In another example, an outside layer (or structural layer) of a multi-layer structure can include an about 2.0 mil (about 0.5-10.0 mil) layer of orientated polyester (OPET), which is laminated to the other layers by means of an urethane adhesive that is about 0.1 mil thick, for example. This "structural layer" can be a polyester orientated (OPET) film, or polyester based synthetic paper, which is designated as a white micro-voided orientated polyester (WMVOPET).

The use of a thicker substrate, by increasing any or all of the polymer thicknesses, may have some advantages: These may include one or both of the following: The cells process better on printing press due to the thicker substrate being less temperature sensitive; and The cell package is stiffer and stronger.

In addition to the above specifications, either or both the outside and the inside layers could include the addition of a print-receptive surface for the required inks. The inside layer is used for the functional inks (such as the collector and/or electrochemical layers) while the outside layer can be used for graphical inks, if desired. Flat cell constructions having a sealed system might utilize a laminated structure that includes metallized films and/or a very thin metal foil or foils as a moisture barrier. Although such structures using a metal layer might have better moisture barrier properties than the constructions used for some of the above described embodiments, it might also have some disadvantages. These may include one or more of the following: Laminated structures with metal barriers (thin metal foil or a vacuum metallized layer) are likely more expensive; Laminated structures with metal layers have the possibility of causing internal shorts; and Laminated structures that include a metal barrier could interfere with the electronics of an application, such as the functionality of a RFID antenna, for example.

The film substrates can be comprised of numerous variations of polymeric film, with or without a barrier layer (including metal or other materials), and can utilize either mono-layer or multi-layer films, such as polyesters or polyolefin. Polyester is a good material to utilize because it provides improved strength permitting use of a thinner gauge film and is typically not easily stretched when used on a multi-station printing press. Vinyl, cellophane, and even paper can also be used as the film layers or as one or more of the layers in the laminated constructions. If a very long shelf life is desired, and/or the environmental conditions are extreme, the multi-ply laminate polymer could be modified to include a metallized layer such as obtained by vacuum deposition of aluminum in place of the oxide coating.

Alternately, a very thin aluminum foil could be laminated within the structure of the film layer, such as for layer, or in a different position. Such a modification could reduce already low water loss to practically nil. On the other hand, if the application is for a relatively short shelf life and/or a short operating life, a more expensive barrier layer could be replaced with a less efficient one which would be of a lower cost and still allow the cell to function for the required lifetime.

In applications where only an extremely short life is necessary, the cell package could instead use a film layer of a low cost polymer substrate such as polyester or polyolefin. It is possible that the pressure sensitive adhesive sealing system for adhering the frame to the top substrate and lower substrate could be replaced with a heat sealing system on the laminates.

In a simplified construction of the upper and/or lower laminate substrates, laminate barrier layers could be laminated together with urethane adhesive layer, for example. Alternatively, a substrate could be provided with an additional layer that is a barrier coating on barrier layer. In addition, layers could be laminated together with urethane adhesive layer.

Alternatively, an example seven-layer laminate substrate could be used for the substrate of the cell. A heat sealing layer can be laminated to the previous structure using an adhesive layer. The approximate 50-gauge heat seal layer can be a composite layer that also includes a heat sealing coating such as amorphous polyester (APET or PETG), semi crystalline polyester (CPET), polyvinyl chloride (PVC), or a polyolefin polymer etc. on polymer film such as polyester. This would thus make the top substrate and/or the bottom substrate of the previously described cell into a 7-ply construction. Depending on the thicknesses of the various layers, any of these structures (three-ply, four-ply, and seven-ply laminates, respectively), the total thickness of these laminates could be about 0.003" with a range of about 0.001-0.015" for at least some embodiments. Alternatively, different substrate constructions could be utilized as well, including more or less layers, depending on the desired applications and qualities.

The various conductive inks described herein could be based on many types of conductive materials such as carbon, silver, gold, nickel, silver coated copper, copper, silver chloride, zinc and/or mixtures of these. For example, one such material that shows useful properties in terms of conductivity and flexibility is silver ink. Furthermore, various circuits, electrical pathways, antennas, etc. that might be part of the printed circuitry can be made by etching aluminum, copper or similar type metallic foils that are laminated on a polymer, such as a polyester substrate. This could be done with many types (sizes and frequencies) of pathways and/or antennas whether they are etched or printed.

The thin printed flexible electrochemical cell includes a printed cathode deposited on a printed cathode collector (e.g., a highly conductive carbon cathode collector) with a printed or foil strip anode placed adjacent to the cathode. Electrochemical cells/batteries of this type are described in co-pending U.S. application Ser. No. 11/110,202 filed on Apr. 20, 2005, Ser. No. 11/379,816 filed on Apr. 24, 2006, Ser. No. 12/809,844 filed on Jun. 21, 2010, Ser. No. 13/075,620 filed on Mar. 30, 2011, Ser. No. 13/625,366 filed on Sep. 24, 2012, and Ser. No. 13/899,291 filed on May 21, 2013, as well as issued U.S. Pat. Nos. 8,029,927, 8,268,475, 8,441,411, 8,574,745, the disclosures of which is incorporated herein by reference. The electrochemical cell/battery can also include a viscous or gelled electrolyte that is dispensed onto a separator that covers all or part of the anode and cathode, and a top laminate can then be sealed onto the picture frame. This type of electrochemical cell was designed to be easily made by printing (e.g., through use of a printing press), and allows, for example, for the cell/battery to be directly integrated with an electronic application.

As shown in FIGS. 5-8, the flexible batteries 2000, 3000 for generating an electrical current are shown in various detail views. Though not explicitly stated, the flexible battery can include any of the battery structure or methodology described herein. The flexible battery, including one or more cells, is printed on a single side of a single substrate (the top substrates are not shown for clarity). It is understood that various portions of the battery could be printed on opposite sides of a substrate, although it can be more cost effective to print the battery on a single side of a substrate. Additionally, though the battery can be formed using a printing process for each element, some or all of the elements can be provided via a non-printed process, such as laminates, adhesives, strips of material, etc.

The battery includes a thin printed flexible electrochemical cell, which may include an optional sealed "picture frame" structure, that includes a printed cathode deposited on a printed cathode collector (e.g., a highly conductive carbon cathode collector) with a printed or foil strip anode placed adjacent to the cathode. The electrochemical cell/battery also includes a viscous or gelled electrolyte that is dispensed onto a separator that covers all or part of the anode and cathode, and a top laminate can then be sealed onto the picture frame. This type of electrochemical cell was designed to be easily made by printing (e.g., through use of a printing press), and allows, for example, for the cell/battery to be directly integrated with an electronic application.

Various other substrates can be utilized as a spacer frame. For example, the third substrate can be composed of various materials, such as PVC or PET film at about 0.0005"-0.030" thick and preferably at about 0-0.005"-0.015" that is sandwiched between (i.e., interposed between) two layers of a pressure sensitive adhesive (PSA) that is about 0.003" thick (0.001"-0.005") and includes a release liner. Additionally the spacer could be printed with a cured dielectric or some other curing and/or drying method. This material, such as Acheson Colloid's PM030, can also be a pressure sensitive adhesive, thus possibly eliminating the need to print an extra layer of adhesive.

To make the manufacturing process of a cell/battery more efficient and/or achieve greater economies of scale, the cell/battery can be manufactured using a generally continuous web in a reel-to-reel printing process to provide production at high speeds and low cost. An example manufacturing procedure is described in the following paragraphs. In this example procedure, the cell/battery proceeds through numerous stations that are compatible with a high-speed printing press running a roll-to-roll setup. Though not further described herein, the processing and assembly could be integrated with the manufacture of the flexible battery or elements thereof to be powered by the battery, such as with the electrical component, etc.

According to available printing presses, the cells could be made with one pass, or multiple passes, on a given press, for example. As an example, two rows of individual cells on the web; however, the number of rows is limited only to the size of the unit cells and the maximum web width that the press can process. Because there may be numerous steps, thereby likely utilizing a long and complicated press, some of these steps, as well as some of the materials, could be modified and/or multiple passes of a press or multiple presses could be used. Moreover, any or all of the printing steps can be performed by screen printing, such as by flat bed screens or even rotary screen stations. Additionally, one skilled in the art would realize that one printing press with more than five stations could be difficult to find and or to operate, and thus the following discussion of the process could occur on one or more presses or even multiple passes through one press.

During manufacturing, various optional operations may or may not occur. For example, the optional operations could include one or both of heat stabilization of the web and graphics printing (which could include logos, contact polarities, printing codes and the addition of registration marks on the outside surface of web). If these optional printing operations occur on the web, then the web can be turned over and the functional inks can be printed on the inside surface, (i.e., the heat seal layer).

One skilled in the art would realize that there are many methods, materials, and sequences of operations that could be used, and that more or less, similar or different, numbers of stations could also be utilized. Various designs and methods of manufacture of a flat cell and batteries are described in co-pending U.S. application Ser. No. 11/110,202 filed on Apr. 20, 2005, Ser. No. 11/379,816 filed on Apr. 24, 2006, Ser. No. 12/809,844 filed on Jun. 21, 2010, Ser. No. 13/075,620 filed on Mar. 30, 2011, Ser. No. 13/625,366 filed on Sep. 24, 2012, and Ser. No. 13/899,291 filed on May 21, 2013, as well as issued U.S. Pat. Nos. 8,029,927, 8,268,475, 8,441,411, 8,574,745, all of which are incorporated herein by reference.

Generally, each of the electrochemical cells described herein can provide about 1.5 volts. However, a number of the electrochemical cells can be electrically coupled together if higher voltages and/or high capacities are desired. For example, a 3 volt battery is obtained by connecting two 1.5 volt unit cells in series, although other voltages and/or currents can be obtained by using unit cells with different voltages and/or by combining different numbers of cells together either in series and/or in parallel. Different electrochemical systems could be customized for the different battery configurations. Preferably, if different cells are used to obtain higher voltages all of the cells in each battery should be of the same electrochemical system. Thus, applications using greater voltages can connect unit cells in series, whereas applications requiring greater currents and/or capacities, unit cells can be connected in parallel, and applications using both can utilize various groups of cells connected in series further connected in parallel. Thus, a variety of applications that use different voltages and currents can be supported using a variety of unit cell and/or battery configuration.

Additionally, it is understood that the new cells described herein can have a generally non-rectilinear geometry, and the theoretical resistance can be similarly determined by dividing the collector height by the narrowest width of the collector area. However, where a generally non-rectilinear geometry is used, the height and width can be determined by an effective height and an effective width, respectively. For example, the effective height or width can be an average height or width, or other mathematically adjusted height and width that can approximate the height and width measurements of a generally rectilinear geometry.

Thin printed flexible batteries can have many potential applications, which can include one or more of the following generally categories as examples: RFID assemblies; advertising and promotion; toys, novelties, books, greeting cards, and games; Inventory tracking and control such as (smart RFID tags); security tags; condition indicators such as temperature, humidity, etc.; skin patches that apply iontophoresis or other electrical function for the purpose of drug delivery, wound care, pain management and/or cosmetics; and Healthcare products such as smart diapers, incontinence products, electronics to log and wirelessly transmit and/or receive health data (such as body temperature), etc.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A flexible battery including at least one electrochemical cell for generating an electrical current, the battery including:
    a first substrate including a pair of opposed side portions defining a first side and an opposite second side;
    a second substrate;
    a cathode collector layer provided on the first substrate along the first side and between the pair of opposed side portions and being formed of a dried or cured ink;
    a cathode layer provided on the cathode collector layer and being formed of a dried or cured ink;
    an anode layer provided on the first substrate along the second side and between the pair of opposed side portions, wherein the cathode and anode layers are disposed in a co-planar arrangement;
    an electrolyte layer including a liquid electrolyte in contact with both of the cathode layer and the anode layer,
    wherein the first substrate is connected and sealed to the second substrate by an outer seal area formed around the perimeter of said at least one cell to form an inner space containing the electrolyte, and also containing at least a major portion of the cathode layer and the anode layer within the inner space; and
    a first electrode contact that is electrically coupled to the cathode collector layer and is disposed along the first side of the first substrate, and a second electrode contact that is electrically coupled to the anode layer and is disposed along the second side of the first substrate,
    wherein the cathode collector layer includes a geometry having a height and a width such that the number of squares is approximately 5 or less, wherein the number of squares is determined by dividing the cathode collector layer height extending in a direction between the first and second sides by the cathode collector layer width extending in a direction along the first side of the first substrate,
    wherein the cathode collector layer extends under a top side of the outer seal area along the first side of the first substrate to at least partially form the first electrode contact, and
    wherein the first substrate includes a cutout area extending therethrough such that the first electrode contact is exposed through the cutout area after the first substrate is connected and sealed to the second substrate.

2. The flexible battery of claim 1, wherein the cathode collector layer includes a geometry having a height and a width such that the number of squares is approximately 1 or less.

3. The flexible battery of claim 1, further including an anode collector layer provided between the anode layer and the first substrate, wherein the cathode collector layer and the anode collector layer are disposed in a co-planar arrangement.

4. The flexible battery of claim 3, wherein the cathode collector layer is disposed along the first side of the first substrate, and the anode collector layer is disposed along the second side of the first substrate.

5. The flexible battery of claim 4, wherein the second electrode contact that is electrically coupled to the anode collector layer.

6. The flexible battery of claim 3, wherein at least one of the anode layer and the anode collector layer is formed of a dried or cured ink.

7. The flexible battery of claim 6, wherein the anode layer includes printed zinc.

8. The flexible battery of claim 3, wherein the anode collector layer includes a geometry having a height and a width such that the number of squares is approximately 5 or less, wherein the number of squares is determined by dividing the anode collector layer height extending in a direction between the first and second sides by the anode collector layer width extending in a direction along the second side of the first substrate.

9. The flexible battery of claim 1, further including a frame interposed between the first and second substrates to connect and seal the first substrate to the second substrate to form the inner space.

10. The flexible battery of claim 9, wherein the frame includes at least one of a cured or dried adhesive ink, and a pressure-sensitive adhesive.

11. The flexible battery of claim 1, wherein the first substrate includes a second cutout area extending therethrough such that the second electrode contact is exposed through the second cutout area after the first substrate is connected and sealed to the second substrate.

12. The flexible battery of claim 1, wherein the electrolyte includes an aqueous solution of zinc chloride (ZnCl2).

13. The flexible battery of claim 1, wherein the electrolyte includes an alkaline electrolyte including at least one of sodium hydroxide (NaOH) or potassium hydroxide (KOH).

14. A flexible battery including at least two electrochemical cells for generating an electrical current, the battery including:
    a first substrate including a pair of opposed side portions;
    a second substrate;
    a first electrochemical cell on the first substrate, including a first cathode collector layer, a first cathode on the first cathode collector layer, and a first anode, wherein the first cathode collector layer is provided on the first substrate between the pair of opposed side portions;

a second electrochemical cell on the first substrate, including a second cathode collector layer, a second cathode on the second cathode collector layer, and a second anode, wherein the second cathode collector layer is provided on the first substrate between the pair of opposed side portions;

first and second liquid electrolytes provided, respectively, in contact with the first and second electrochemical cells, wherein the second substrate layer is connected to the first substrate layer to form first and second inner spaces, respectively, containing each of said first and second liquid electrolytes;

a first electrical bridge that electrically couples the first electrochemical cell to the second electrochemical cell in a parallel arrangement; and a first electrode contact that is electrically coupled to the first cathode collector layer and is disposed along one of the pair of opposed side portions of the first substrate, and a second electrode contact that is electrically coupled to the first anode layer and is disposed along the other of the pair of opposed side portions of the first substrate, wherein each of the first and second cathode collector layers includes a geometry having a height and a width such that the number of squares is approximately 5 or less, respectively, wherein the number of squares is determined by dividing the respective cathode collector layer height extending in a direction between the pair of opposed side portions by the respective cathode collector layer width extending in a direction along one of the pair of opposed side portions of the first substrate.

15. The flexible battery of claim 14, further including first anode collector layer provided to the first electrochemical cell between the first anode layer and the first substrate, and a second anode collector layer provided to the second electrochemical cell between the second anode layer and the first substrate.

16. The flexible battery of claim 15, wherein the electrical bridge electrically couples the first and second cathode collector layers together, and wherein the battery further includes a second electrical bridge that electrically couples the first and second anode collector layers together.

17. The flexible battery of claim 16, wherein the first electrode contact is provided on the first electrical bridge, and the second electrode contact is provided on the second electrical bridge.

18. The flexible battery of claim 15, wherein each of the first and second anode collector layers includes a geometry having a height and a width such that the number of squares is approximately 5 or less, respectively, wherein the number of squares is determined by dividing the respective anode collector layer height extending in a direction between the pair of opposed side portions by the respective anode collector layer width extending in a direction along one of the pair of opposed side portions of the first substrate.

19. The flexible battery of claim 14, wherein both of the first and second cathode collector layers are disposed along the same one of the pair of opposed side portions of the first substrate, and wherein both of the first and second anodes are disposed along the same other of the pair of opposed side portions of the first substrate.

20. The flexible battery of claim 14, wherein the first cathode and anode layers are disposed in a co-planar arrangement, and wherein the second cathode and anode layers are disposed in a co-planar arrangement.

21. The flexible battery of claim 14, wherein all of said first and second cathode current collectors, first and second cathodes, and first and second anodes include cured or dried inks.

22. The flexible battery of claim 14, further including third and fourth electrochemical cells on the first substrate that each include a cathode collector layer that is electrically coupled to the first and second cathode collector layers.

23. The flexible battery of claim 14, wherein the electrolyte includes an aqueous solution of zinc chloride (ZnCl2).

24. The flexible battery of claim 14, wherein the electrolyte includes an alkaline electrolyte including at least one of sodium hydroxide (NaOH) or potassium hydroxide (KOH).

* * * * *

UNITED STATES PATENT AND TRADEMARK OFFICE
CERTIFICATE OF CORRECTION

| | |
|---|---|
| PATENT NO. | : 9,444,078 B2 |
| APPLICATION NO. | : 14/091981 |
| DATED | : September 13, 2016 |
| INVENTOR(S) | : Tucholski |

It is certified that error appears in the above-identified patent and that said Letters Patent is hereby corrected as shown below:

In the Specification

Column 23, Line 16: delete "3°" and insert -- 30 --

Column 23, Line 19: delete "4°" and insert -- 40 --

Signed and Sealed this
Third Day of January, 2017

Michelle K. Lee
*Director of the United States Patent and Trademark Office*